(12) United States Patent
Kinoshita et al.

(10) Patent No.: US 9,281,613 B2
(45) Date of Patent: Mar. 8, 2016

(54) BATTERY WIRING MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Yuko Kinoshita, Yokkaichi (JP); Tomofumi Tsuji, Yokkaichi (JP); Mitsuhiro Akasaka, Yokkaichi (JP); Daiki Hirano, Utsunomiya (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 17 days.

(21) Appl. No.: 14/355,466

(22) PCT Filed: Nov. 1, 2012

(86) PCT No.: PCT/JP2012/078287
§ 371 (c)(1),
(2) Date: Apr. 30, 2014

(87) PCT Pub. No.: WO2013/069526
PCT Pub. Date: May 16, 2013

(65) Prior Publication Data
US 2014/0256178 A1 Sep. 11, 2014

(30) Foreign Application Priority Data
Nov. 11, 2011 (JP) .................... 2011-247648

(51) Int. Cl.
*H01R 24/00* (2011.01)
*H01R 33/00* (2006.01)
(Continued)

(52) U.S. Cl.
CPC ............... *H01R 13/60* (2013.01); *B60R 16/04* (2013.01); *H01M 2/206* (2013.01); *H01M 10/48* (2013.01)

(58) Field of Classification Search
CPC .......... Y02E 60/12; H01R 31/08; H01R 9/24; H01R 13/60
USPC .......................... 439/529, 510, 627, 709, 500
See application file for complete search history.

(56) References Cited

U.S. PATENT DOCUMENTS

| 8,304,655 B2 | 11/2012 | Ikeda et al. |
| 2010/0288532 A1 | 11/2010 | Ikeda et al. |

(Continued)

FOREIGN PATENT DOCUMENTS

| JP | A-2010-267586 | 11/2010 |
| JP | A-2011-008955 | 1/2011 |

(Continued)

OTHER PUBLICATIONS

International Search Report issued in International Application No. PCT/JP2012/078287 mailed Dec. 11, 2012.

(Continued)

*Primary Examiner* — Hae Moon Okhyeon
(74) *Attorney, Agent, or Firm* — Oliff PLC

(57) ABSTRACT

A battery wiring module attached to a battery group formed by juxtaposing a plurality of batteries each having electrode terminals, includes: a plurality of bus bars; and a plurality of holder units made of an insulating resin and having holding portions and holding the bus bars. The holder units include: a first holder unit disposed at an end; and a second holder unit which is a holder unit other than the first holder unit. The holding portion of the second holder unit is provided with a bus bar insertion portion through which the bus bars are inserted in the direction in which the batteries are juxtaposed, and the second holding portion of the first holder unit is provided with an encompassing wall and adapted to insert the bus bars in a direction in which the first holder unit is attached to the battery group.

4 Claims, 10 Drawing Sheets

(51) Int. Cl.
  *H01R 13/60* (2006.01)
  *B60R 16/04* (2006.01)
  *H01M 2/20* (2006.01)
  *H01M 10/48* (2006.01)

(56) References Cited

U.S. PATENT DOCUMENTS

| | | | |
|---|---|---|---|
| 2012/0164509 A1 | 6/2012 | Ogasawara et al. | |
| 2012/0231638 A1 | 9/2012 | Ikeda et al. | |
| 2012/0328920 A1 | 12/2012 | Takase et al. | |
| 2013/0178091 A1 | 7/2013 | Ogasawara et al. | |
| 2013/0309553 A1* | 11/2013 | Kinoshita et al. | 429/158 |
| 2014/0113494 A1* | 4/2014 | Kinoshita et al. | 439/627 |
| 2014/0315441 A1* | 10/2014 | Kinoshita et al. | 439/627 |
| 2014/0329136 A1* | 11/2014 | Kinoshita et al. | 429/158 |
| 2014/0329413 A1* | 11/2014 | Ogasawara et al. | 439/627 |
| 2015/0125727 A1* | 5/2015 | Lui et al. | 429/90 |

FOREIGN PATENT DOCUMENTS

| | | |
|---|---|---|
| JP | 2011-049049 A | 3/2011 |
| JP | A-2011-049047 | 3/2011 |
| JP | A-2011-077031 | 4/2011 |
| JP | U-3168335 | 6/2011 |
| JP | A-2011-210710 | 10/2011 |
| JP | A-2011-228216 | 11/2011 |

OTHER PUBLICATIONS

Written Opinion of the International Searching Authority issued in International Application No. PCT/JP2012/078287 mailed Dec. 11, 2012 (with partial translation).

Feb. 17, 2015 Office Action issued in Japan Application No. 2011-247648.

Aug. 28, 2015 Office Action issued in Chinese Application No. 201280055189.3.

* cited by examiner

BATTERY WIRING MODULE

TECHNICAL FIELD

This invention relates to a battery wiring module.

BACKGROUND ART

In a battery module for use in electric vehicles and hybrid vehicles, a plurality of batteries each having electrode terminals at its cathode and anode is arranged in juxtaposition. In such a battery module, the batteries are electrically connected with one another by connecting the electrode terminals of the cathodes (positive electrode terminals) with the electrode terminals of the anodes (negative electrode terminals) with use of connectors such as bus bars.

In order to electrically connect the batteries, a battery wiring module as disclosed in, for instance, Patent Document 1, is used.

RELATED ART DOCUMENT

Patent Document

[Patent Document 1] Japanese Unexamined Patent Application Publication No. 2011-8955

According to the battery wiring module disclosed in Patent Document 1 mentioned above, a plurality of resin holder units each having a holding portion that holds the bus bar is coupled together. After the bus bars are housed within the holding portions of the holder units from the above, the holder units are placed onto terminal forming surfaces of the batteries (i.e., the electrode-terminals forming surfaces), and the bus bars are connected with the electrode terminals.

The holding portions of the holder units of the battery wiring module are each provided with a locking projection adapted to prevent the bus bar from disengaging therefrom (see FIG. 3 of Patent Document 1). The locking projection is provided at an end of an elastic piece provided between two slits formed to extend in an up-and-down direction of the holding portion. When the connectors such as the bus bars are held while being exposed from the holding portions as described above, the connectors may contact other members made of conductive materials and disposed in the neighborhood of the battery, and a short circuit may be caused.

Therefore, there is a need in the art to provide a battery wiring module preventing a short circuit due to contact of connectors with members disposed in the neighborhood of batteries.

When a holder unit configured such that the connectors are inserted into the holding portion in the attaching direction (e.g., from the above) is concerned, the configuration adapted to lock the connectors needs to be configured to not interfere with the insertion of the connectors from the above (e.g., a configuration including a pair of slits and an elastically-deformable elastic piece provided between the slits), as disclosed in Patent Document 1 mentioned above. However, when a holder unit configured such that the connectors are inserted in the direction in which the battery group is juxtaposed (horizontal direction) is concerned, there is no need to configure the configuration adapted to lock the connectors in an elastically deformable manner. Thus, without providing slits and the like, the connectors are locked by a protrusion protruding inward from an inner wall of the holding portion.

Hence, studies have been made with respect to a battery wiring module using a plurality of holder units each including a holding portion provided with a connector insertion portion through which the connectors are inserted in the direction in which the battery group is juxtaposed.

However, when a holder unit including a holding portion provided with a connector insertion portion through which the connectors are inserted in the direction in which the battery group is juxtaposed is disposed at an end, and the connector insertion portion is located at the outermost position, the connector exposed through the connector insertion portion may contact members and the like disposed in the neighborhood, and may cause a short circuit. Thus, as the result of the pursuance of the further studies, the inventors have reached the invention.

Specifically, an aspect of the invention provides a battery wiring module attached to a battery group formed by juxtaposing a plurality of batteries each having positive and negative electrode terminals, and the battery wiring module includes: a plurality of connectors connected to the electrode terminals; and a plurality of holder units made of an insulating resin and having holding portions that holds the connectors. In the battery wiring module, the holder units include: a first holder unit disposed at an end; and a second holder unit which is a holder unit other than the first holder unit. Further in the battery wiring module, the holding portion of the second holder unit is provided with a connector insertion portion through which the connectors are inserted in the direction in which the batteries are juxtaposed, while the holding portion of the first holder unit is provided with an encompassing wall encompassing the entire circumferential edges of the connectors and adapted to insert the connectors in a direction in which the first holder unit is attached to the battery group.

According to the aspect of the invention, even when the connector is exposed through the connector insertion portion of the second holder unit, the first holder unit is disposed at the end, and the first holder unit has the holding portion provided with the encompassing wall encompassing the entire circumferential edge of the connector. Therefore, according to the aspect of the invention, the connector is not exposed from the holder unit, and thus a short circuit is prevented from being caused due to a contact of the connector with a member disposed in the neighborhood thereof.

When a holder unit configured such that the connectors are inserted in the direction in which the holder unit is attached is concerned, the holder unit may collide with the electrode terminal forming surfaces of the batteries included in the battery group or with the electrode terminals at the time of attaching the holder unit to the battery group. Such collision may press upward the connectors and disengage the connectors therefrom, thereby reducing the efficiency of the attachment of the holder unit to the battery group.

However, according to the aspect of the invention, the holder units other than the first holder unit disposed at the end are the second holder units each having the holding portion provided with the connector insertion portion through which the connectors are inserted in the direction in which the batteries are juxtaposed. Thus, the connectors are not easily disengaged therefrom, and the efficiency in attaching the holder unit to the battery group is enhanced.

According to the aspect of the technology described in the specification, the battery module prevents a short circuit from being caused due to the contact of the connectors with the members disposed in the neighborhood of the batteries.

BEST MODE FOR CARRYING OUT THE INVENTION

First Embodiment

Figure 1:
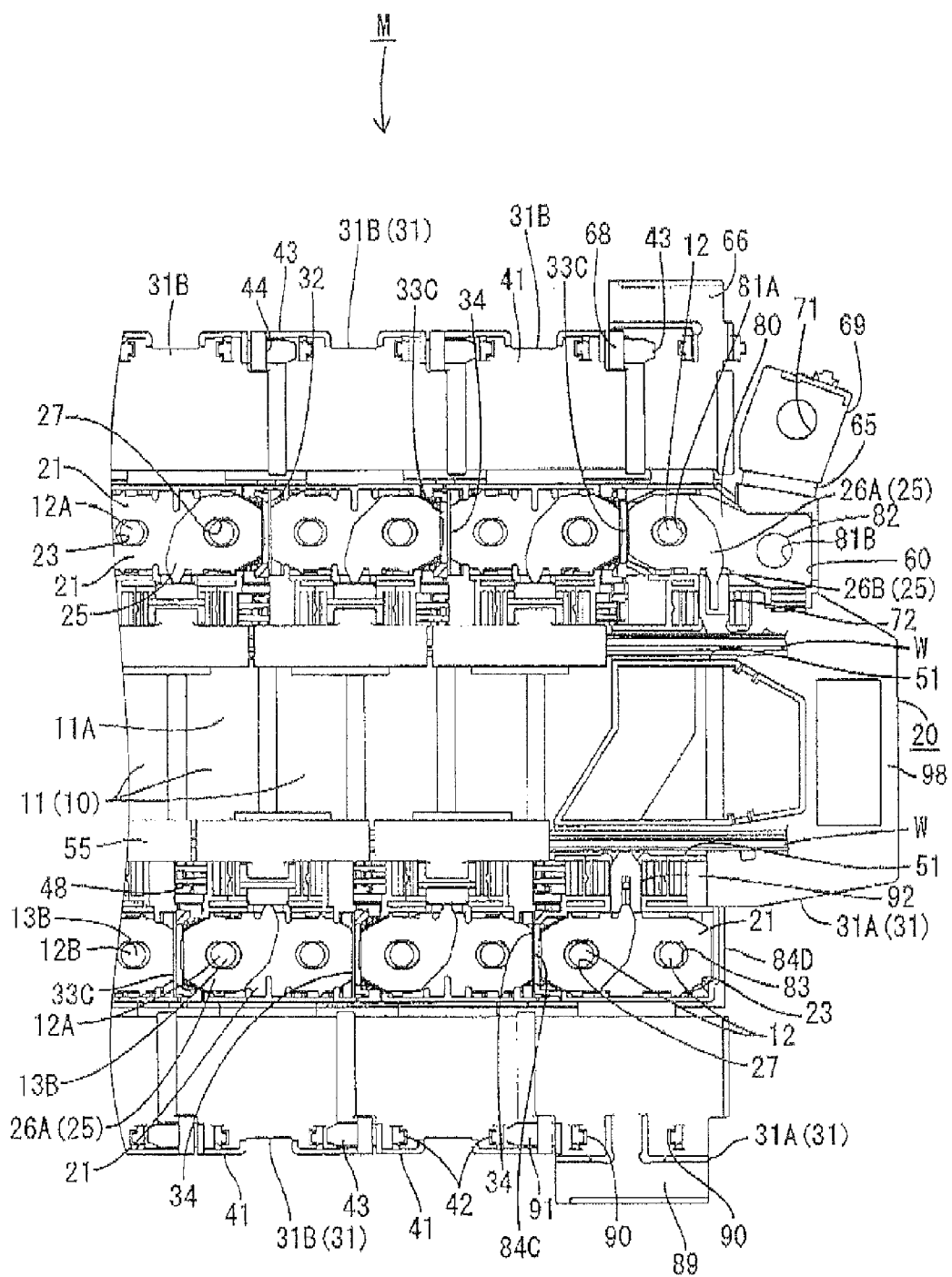
FIG. 1 is a plan view depicting a battery module according to a first embodiment.

A first embodiment of the invention will be described with reference to FIGS. 1 to 10. A battery wiring module 20 according to this embodiment is attached to a battery group 10 provided by juxtaposing a plurality of batteries 11 each having electrode terminals 12 at its cathode and anode. In FIG. 1, a part of the battery group 10 (seven batteries) is depicted. In the following description, the electrode terminal 12 at the cathode will be referred to as a positive electrode terminal 12A while the electrode terminal 12 at the anode will be referred to as a negative electrode terminal 12B. The positive electrode terminal 12A and the negative electrode terminal 12B are collectively referred to as the electrode terminals 12.

A battery module M, which is provided by attaching the battery wiring module 20 according to this embodiment to the battery group 10, is used as the driving source of vehicles (not depicted) such as electric vehicles and hybrid vehicles. The plurality of batteries 11 included in the battery group 10 is connected with one another in series by electrically connecting the positive electrode terminal 12A of one battery 11 with the negative electrode terminal 12B of another battery 11 with use of the battery wiring module 20. In the following description, the upper side and the lower side shall refer to the upper side and the lower side in FIGS. 4, 7, 9 and 10 respectively.

(Battery 11)

Each battery 11 is flat and rectangular. As depicted in FIG. 1, the upper surface 11A of the battery 11 is provided with the positive electrode terminal 12A and the negative electrode terminal 12B. The electrode terminals 12 each include: a base (not depicted) made of a metal plate; and an electrode post 13B protruding upward from the base to form a round bar shape. The surface of the electrode post 13B is provided with a screw thread (not depicted).

The plural batteries 11 are arranged such that the electrode terminals 12 of the neighboring batteries 11 respectively exhibit different polarities (i.e., the positive electrode terminal 12A and the negative electrode terminal 12B are alternately arranged). The electrode post 13B is inserted into a through hole 23 of a bus bar 21 (an example of a connector), and fixed to the bus bar 21 by screwing (not depicted). In addition, the plural batteries 11 are fixed together by a holder (not depicted) such that the batteries 11 form the battery group 10.

(Battery Wiring Module 20)

The battery wiring module 20 is attached to two lines of the electrode terminals 12 that extend in the right and left direction of the battery group 10 as depicted in FIG. 1. The battery wiring module 20 includes: a plurality of bus bars 21 each having a pair of through holes 23 (connected portion), into which the electrode posts 13B of the positive electrode terminal 12A and the negative electrode terminal 12B of the batteries 11 are inserted for connection; a plurality of voltage detecting terminals 25 connected to the bus bars 21 and adapted to detect the voltages of the batteries 11; and a plurality of holder units 31 each made of an insulating resin and each having a holding portion 32 that holds the bus bar 21.

(Holder Unit 31)

As depicted in FIG. 1, the plural holder units 31 are juxtaposed in the direction in which the batteries 11 are arranged, and jointed together. The joint structure of the holder units 31 will be described later in detail.

As depicted in FIG. 1, the holder units 31 include: first holder units 31A positioned at ends; and second holder units 31B which are holder units other than the first holder units 31A. The holder unit 31 positioned at the right end in FIG. 1 is the first holder unit 31A while the holder units 31 other than the first holder unit 31A in FIG. 1 are the second holder units 31B. In the following description, the second holder units 31B and the first holder units 31A will be sequentially described in this order.

(Second Holder Unit 31B)

Figure 2:
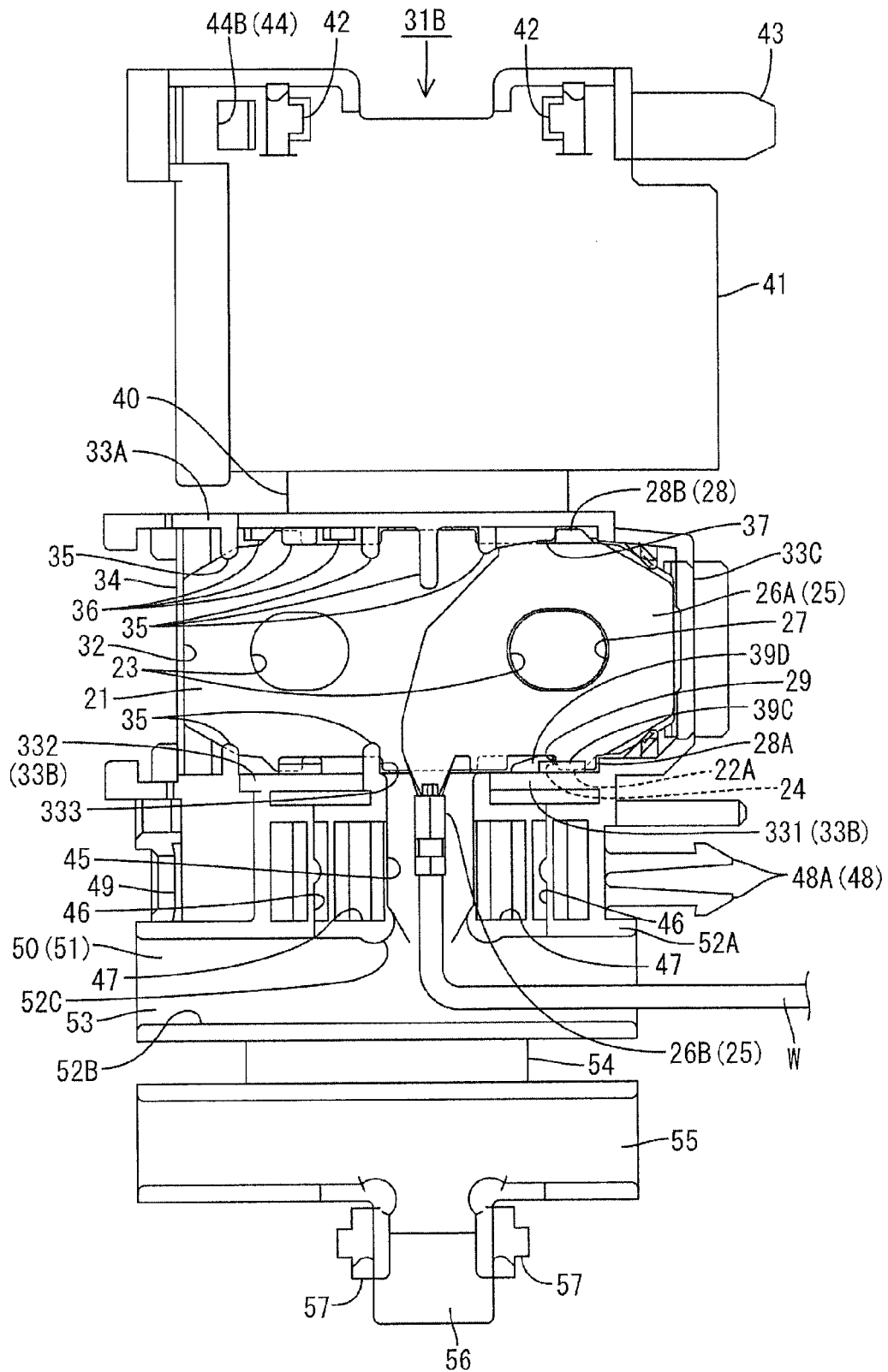
FIG. 2 is a perspective view depicting a second holder unit.
Figure 3:
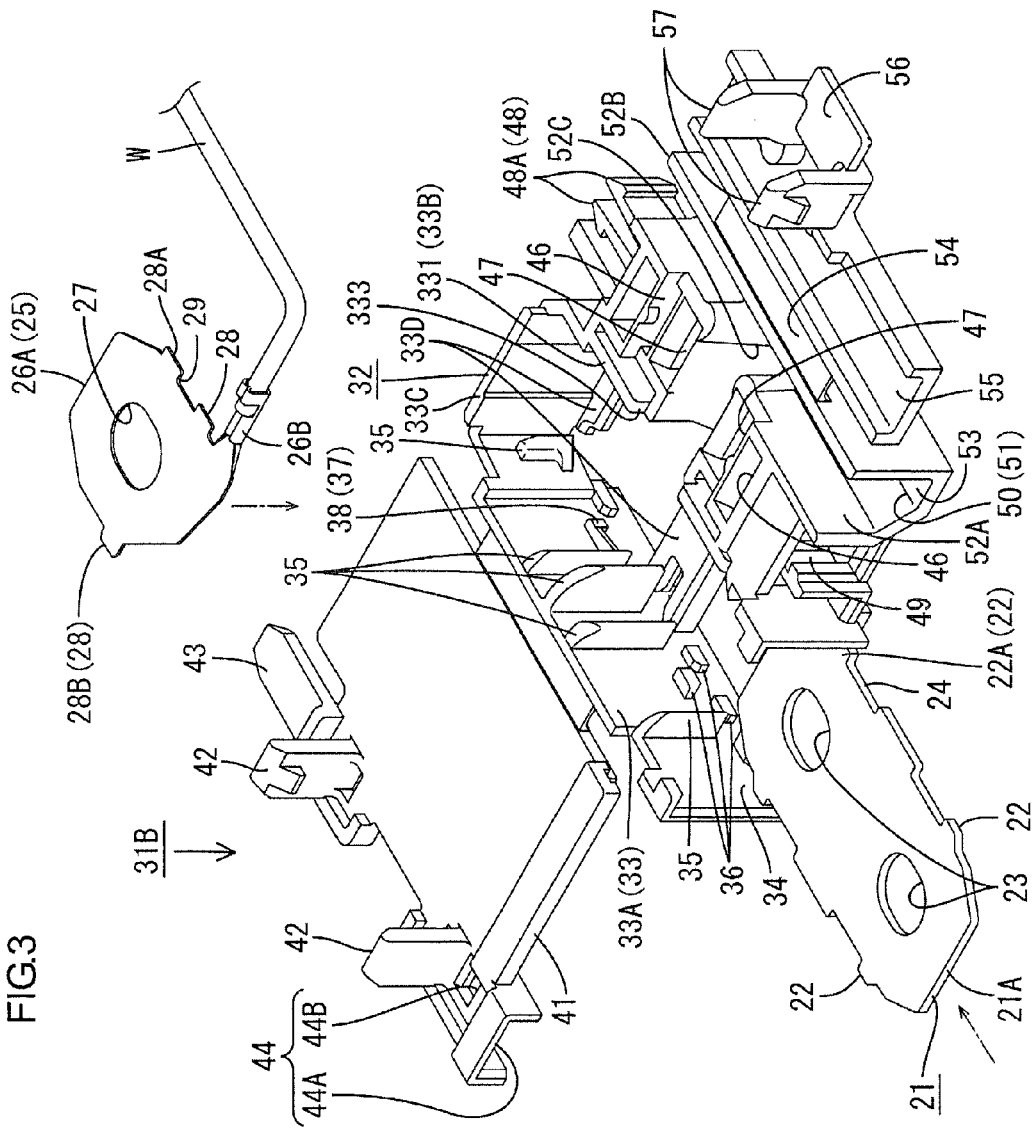
FIG. 3 is a plan view depicting the second holder unit.

As depicted in FIGS. 2 and 3, the second holder units 31B each include: a holding portion 32 that houses and holds the bus bar 21 and the voltage detecting terminal 25; a guiding groove 45 through which a detecting wire W connected to the voltage detecting terminal 25 is taken out; a wire housing 50 that houses the detecting wire W of the voltage detecting terminal 25 taken out through the guiding groove 45; a first lid 41 that covers the holding portion 32; and a second lid 55 that covers the wire housing 50. These members are integrally formed. In the following description, each member of the second holder unit 31B will be described.

(Holding Portion 32 of Second Holder Unit 31B)

As depicted in FIG. 3, the holding portion 32 of the second holder unit 31B, which opens upward, includes: a wall 33 (33A, 33B and 33C) closing three lateral sides other than the left side in FIG. 2 such that the bus bar 21 is housed; and a bottom wall 33D upon which the bus bar 21 is mounted.

As depicted in FIG. 2, the bottom wall 33D is partially provided to each of the substantially central portion, left end portion and right end portion of the holding portion 32. The bus bar 21 is partially mounted on the bottom wall 33D, and the bottom wall 33D is configured to not interrupt the electric connection between the bus bar 21 and the electrode terminal 12.

The wall portion 33, although the details thereof are not depicted, is sized to be higher than the upper end of the electrode terminal 12 when the battery wiring module 20 is attached to the battery group 10. This arrangement suppresses tools or the like from contacting the positive terminal 12A and the negative terminal 12B, thereby suppressing the short circuit between the positive terminal 12A and the negative terminal 12B via the tools or the like.

The wall 33 includes: a rear wall 33A extending along a first lengthwise lateral edge of the bus bar 21, which is positioned on the side apart from the reader in FIG. 2; a front wall 33B extending along a second lengthwise lateral edge of the bus bar 21, which is positioned on the side closer to the reader in FIG. 2; and a right wall 33C extending along a right shorter lateral edge of the bus bar 21, which is positioned on the right side in FIG. 2. At substantially the lengthwise center of the front wall 33B, an opening 333 is opened to penetrate through the guiding groove 45, and the opening 333 divides the front wall 33B into two portions. In respect of the two divisional portions of the front wall 33B divided by the opening 333, the first one located on the right side in FIG. 2 will be referred to as a right front wall 331 while the second one located on the left side in FIG. 2 will be referred to as a left front wall 332.

In this embodiment, the holding portion 32 has no wall 33 in a direction facing a left shorter lateral edge of the bus bar 21, which is positioned on the left side in FIG. 2 (left lateral edge 21A), thereby providing an open end 34 (see, FIG. 3). Through the open end 34, the bus bar 21 is inserted in the direction in which the batteries 11 are juxtaposed (the right and left direction in FIG. 2), and the open end 34 serves as a bus bar insertion portion 34 (an example of a connector insertion portion).

The right wall 33C of the holding portion 32 serves as an insulating wall 33C that maintains the insulation from the bus bar 21 held by the neighboring second holder unit 31B.

As depicted in FIGS. 2 and 3, the inner walls of the front wall 33B and the rear wall 33A are each provided with a plurality of locking portions 35 that protrude inward and lock the inserted bus bar 21 by restricting the movement of the bus bar 21 in the up and down direction.

The region of the rear wall 33A closer to the open end 34 relative to the center (the left side in FIG. 2) is provided with a guide 36. As depicted in FIG. 2, the guide 36 protrudes from the region and guides the bus bar 21 inserted into the holding portion 32 through the open end 34 (the bus bar insertion portion) of the holding portion 32, to the front side in the insertion direction (i.e., toward the insulating wall 33C).

The region of the rear wall 33A closer to the right wall 33C relative to the center (the right side in FIG. 2) is provided with a terminal locking piece 37. The terminal locking piece 37 protrudes from the region and restricts the voltage detecting terminal 25 from moving upward and from moving frontward in the insertion direction of the bus bar 21 (i.e., toward the right side). The terminal locking piece 37 protrudes to extend in the insertion direction of the bus bar 21, and the bus bar 21 and the voltage detecting terminal 25 are disposed under the terminal locking piece 37. The front end of the terminal locking piece 37 (i.e., the end located on the front side in the insertion direction of the bus bar 21) is provided with a locking protrusion 38, and the locking protrusion 38 locks a second protruding piece 28B of the voltage detecting terminal 25 (the details of which will be later described).

Figure 6:
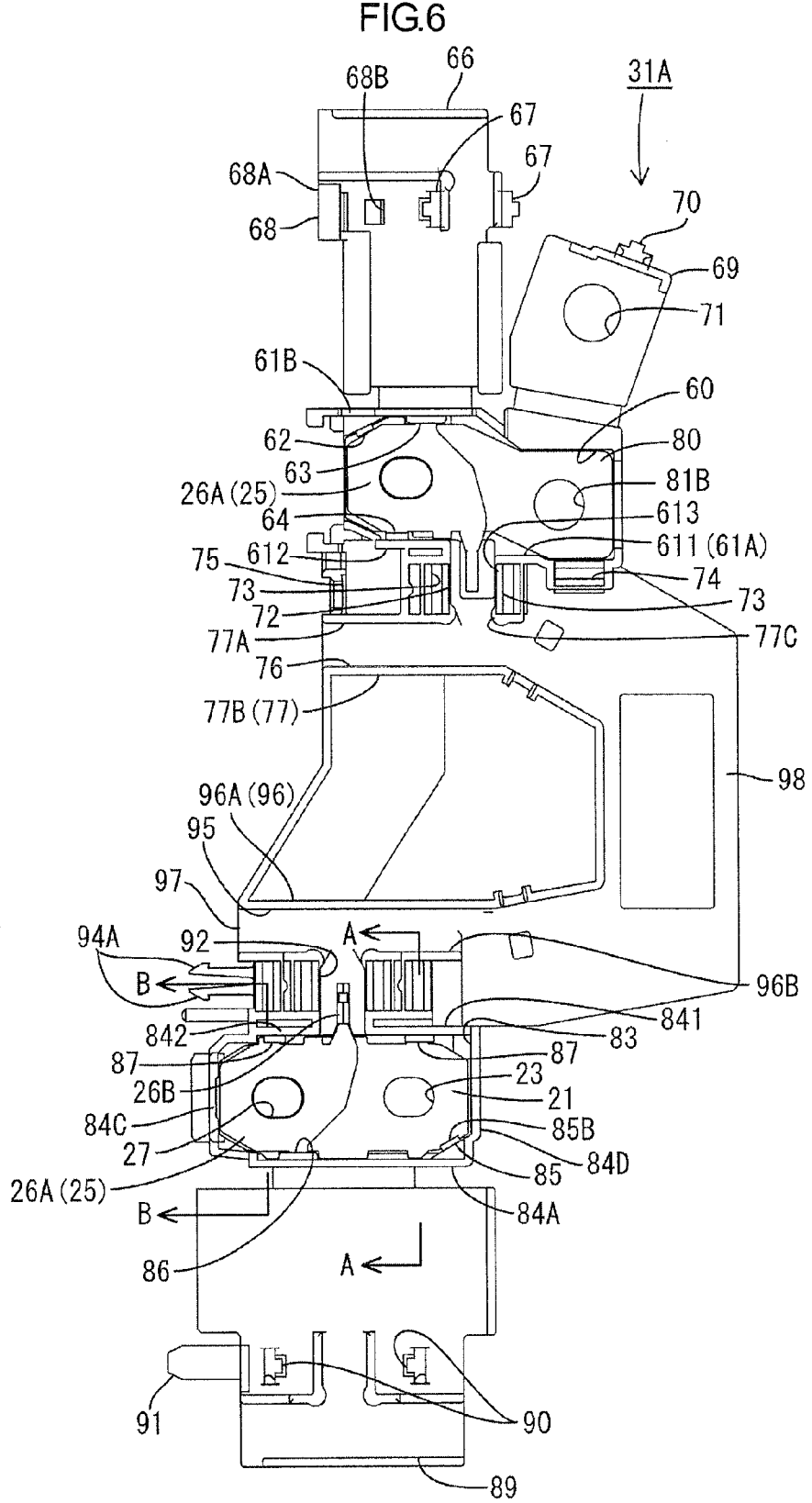
FIG. 6 is a plan view depicting the first holder unit.

In this embodiment, as depicted in FIG. 6, the rear wall 33A of the holding portion 32 has no portion through which the bus bar 21 is exposed to the outside of the holding portion 32 (e.g., slit). Accordingly, the rear wall 33A extending in the direction in which the batteries are juxtaposed holds the bus bar 21 without exposing the bus bar 21 from the holding portion 32. Thus, the rear wall 33A prevents the short circuit from being caused by a contact of the tools or metal members disposed in the neighborhood with the bus bar 21.

Figure 4:
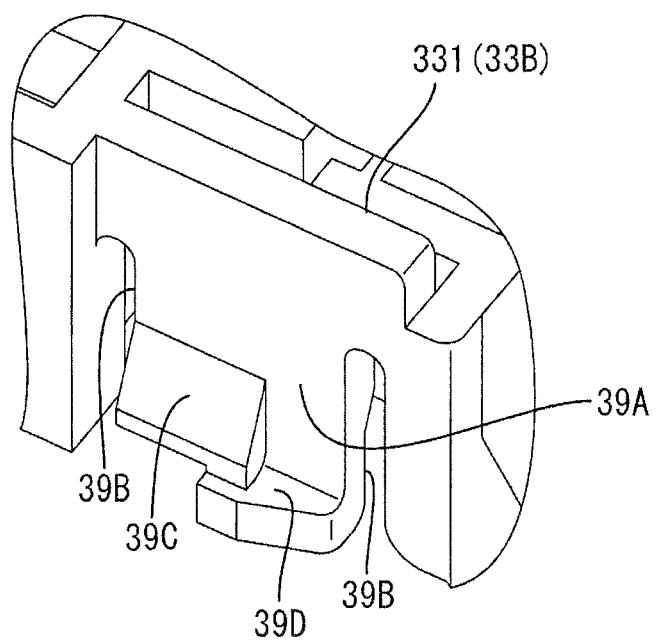
FIG. 4 is a magnified perspective view primarily depicting a locking portion of the second holder unit.

As depicted in FIG. 4, the right front wall 331 of the holding portion 32 is provided with two slits 39B extending upward from the lower end, and an elastic engaging piece 39A is formed between the two slits 39B. The elastic engaging piece 39A includes: a terminal locking nail 39C that locks the voltage detecting terminal 25; and a bus bar locking nail 39D that locks the bus bar 21. The terminal locking nail 39C and the bus bar locking nail 39D are juxtaposed in the up and down direction. The bus bar locking nail 39D is displaced from the terminal locking nail 39C rearward in the insertion direction of the bus bar 21 (i.e., toward the right side in FIG. 4), and the terminal locking nail 39C and bus bar locking nail 39D are partially layered on each other.

The terminal locking nail 39C is elastically deformed outward of the wall 33 when a first protruding piece 28A (the detail of which will be described later) of the voltage detecting terminal 25 inserted from the above abuts on the terminal locking nail 39C. However, when the voltage detecting terminal 25 is positioned at a position lower than the lower end of the terminal locking nail 39C, the terminal locking piece 39C elastically returns to the original position, thereby restricting the voltage detecting terminal 25 from moving upward.

The bus bar locking nail 39D is elastically deformed outward of the wall 33 when an expanded portion 22A of the bus bar 21 inserted through the open end 34 passes. However, when a recess 24 of the bus bar 21 is positioned, the bus bar locking nail 39D is accepted into the recess 24 and elastically returns to the original position. With this operation, the bus bar 21 is locked by the bus bar locking nail 39D. In this embodiment, a recess 29 of the voltage detecting terminal 25, which is located right above the recess 24 of the bus bar 21, is also locked by the bus bar locking nail 39D.

(First Lid 41)

As depicted in FIGS. 1, 2 and 3, the holding portion 32 is provided integrally with the first lid 41 via a hinge 40 continued from the upper end of the rear wall 33A. The first lid 41 is rotated around the hinge 40. When the first lid 41 is closed, the first lid covers the entire holding portion 32 as well as a part of the guiding groove 45.

As depicted in FIGS. 2 and 3, a pair of first locking pieces 42 protrudes from the surface of the first lid 41 that faces downward when the first lid 41 is closed. The first locking pieces 42 are locked by first locking grooves 46 formed at positions adjacent to second locking grooves 47 (described later) provided to both widthwise sides of the guiding groove 45. The first lid 41 includes a lid joint engaging piece 43 and a lid joint engaged portion 44 that joint the first lid 41 with the first lids 41 of the respective neighboring holder units 31. The lid joint engaging piece 43 and the lid joint engaged portion 44 are positioned at positions adjacent to the paired first locking pieces 42, and any further details thereof will be described later.

(Guiding Groove 45)

In the guiding groove 45, a barrel 26B of the voltage detecting terminal 25 taken out from the holding portion 32 and a detecting wire W crimped to the barrel 26B are disposed. The guiding groove 45 is a groove member in communication with the holding portion 32 and the wire housing 50. The guiding groove 45 is recessed, and extends substantially perpendicularly to the direction in which the batteries 11 are juxtaposed. More specifically, the guiding groove 45 penetrates through the opening 333 of the front wall 33B of the holding portion 32 to be in communication with the holding portion 32, and also penetrates through an opening 52C of a rear groove wall 52A (details of which will be described later) of the wire housing 50 to be in communication with the wire housing 50.

(Wire Housing 50)

The wire housing 50 is a recess in the cross sectional view, and the recess is defined by: a pair of groove walls 52 extending in the direction in which the batteries 11 are juxtaposed; and a bottom wall 53 connecting the paired groove walls 52 together. By jointing the holder units 31 together, the wire housing 50 are coupled together to be in communication with each other, such that a single groove (wire housing groove 51) is formed to extend in the direction in which the batteries 11 are juxtaposed.

Each detecting wire W taken out from the guiding groove 45 of each holder unit 31 is bent at substantially a right angle, and housed in the wire housing 50 along the extending direction of the wire housing 50. The plurality of detecting wires W housed in the wire housing 50 is guided to a monitoring ECU (not depicted).

The monitor ECU, which has a known configuration installed with a micro computer, devices and the like, detects the voltage, the current, the temperature and the like of the batteries 11, and monitors to control the batteries 11.

In respect of the paired groove walls 52, the groove wall located closer to the guiding groove 45 will be referred to as a rear groove wall 52A while the other groove wall will be referred to as a front groove wall 52B. The rear groove wall 52A is provided to correspond to the front wall 33B of the holding portion 32. Even if the bus bar 21 or the voltage detecting terminal 25 is exposed through the slits 39B formed at both sides of the elastic piece 39A or through a slit cutout between a lower end of the elastic piece 39A and the bottom wall 33D, the rear groove wall 52A serves to prevent the bus bar 21 or the voltage detecting terminal 25 from contacting the conductive members and the like disposed in its neighborhood.

The rear groove wall 52A is provided with an opening 52C dividing the rear groove wall 52A into two portions. The guiding groove 45 penetrates through the opening 52C. From the front groove wall 52B, the second lid 55 covers the wire housing 50 is continuously formed via a hinge 54.

(Second Lid 55)

As depicted in FIGS. 2 and 3, the wire housing 50 is provided integrally with the second lid 55 via the hinge 54 continued from the lateral surface of the front groove wall 52B. The second lid 55 is rotated around the hinge 54. When the second lid 55 is closed, the second lid 55 covers the entire wire housing 50 (see, FIG. 1). The lateral edge of the second lid 55 is provided with an extension lid 56 having a pair of second locking pieces 57 that lock the second lid 55. When the second lid 55 is closed, the extension lid 56 covers the guiding groove 45 from the above. The second locking pieces 57 protrude from both widthwise lateral edges of the extension lid 56. The second locking pieces 57 are locked by the second locking grooves 47 formed at both widthwise sides of the guiding groove 45.

In this embodiment, when the first lid 41 is closed after the closure of the second lid 55, a part of the extension lid 56 of the second lid 55 and a part of the first lid 41 are layered upon each other, such that the guiding groove 45 is doubly covered with the extension lid 56 of the second lid 55 as well as the first lid 41. With this configuration, the entire upper region of the holder unit 31 is kept covered with the lids 41 and 55.

(Coupling Structure of Second Holder Units 31B)

In the next description, the coupling structure for use in coupling the neighboring holder units 31 together will be described. As depicted in FIGS. 2 and 3, the second holder unit 31B includes: a joint engaging nail 48 that joints the neighboring holder units 31 together; and a joint engaging recess 49 engageable with the joint engaging nail 48, and the joint engaging nail 48 and the joint engaging recess 49 are positioned adjacently to the paired first locking grooves 46 of the second holder unit 31B. The joint engaging nail 48 is positioned to the right of the first locking groove 46 located on the right side in the depiction while the joint engaging recess 49 is positioned to the left of the first locking groove 46 located on the left side in the depiction.

When a pair of elastic pieces 48A included in the joint engaging nail 48 of the holder unit 31 is inserted into the joint engaging recess 49 of the holder unit 31 that neighbors the former holder unit 31, the joint engaging nail 48 is elastically deformed in a direction in which the paired elastic pieces 48A approach each other, to be inserted into the joint engaging recess 49. When the joint engaging nail 48 reaches a predetermined position within the joint engaging recess 49, the elastic pieces 48A elastically return to their original positions, thereby engaging with the joint engaging recess 49.

Further, as depicted in FIGS. 2 and 3, the first lid 41 of the second holder unit 31B includes the lid joints 43 and 44 for use in jointing the first lids 41 of the neighboring holder units 31. The lid joints 43 and 44 are positioned at both sides of the paired first locking pieces 42 of the first lid 41. The right end of the first lid 41 (as depicted in FIG. 4) is provided with the lid joint engaging piece 43 while the left end of the first lid 41 (as depicted in FIG. 4) is provided with the lid joint engaged portion 44.

The end of the lid joint engaging piece 43 includes a joint engaging projection 43A that engages with a joint engaged hole 44B or 68B of the lid joint engaged portion 44 or 68 paired with the lid joint engaging piece 43. The lid joint engaged portion 44 includes: an engaging piece insertion portion 44A that accepts the insertion of the lid joint engaging piece 43 or 91 and penetrating in the direction in which the holder units 31 are jointed; and the joint engaged hole 44B provided adjacently to the engaging piece insertion portion 44A that accepts the joint engaging projection 43A of the lid joint engaging piece 43 or 91 for the engagement therewith. By inserting the lid joint engaging piece 43 into the engaging piece insertion portion 44A of the lid joint engaged portion 44, the joint engaging projection 43A is engaged with the joint engaged hole 44B. In this manner, the neighboring first lids 41 are jointed together.

(Bus Bar 21)

The bus bar 21, which is held by the holding portion 32 of the second holder unit 31B, is formed through press working by shaping into a predetermined shape a plate material made of copper, copper alloy, stainless steel, aluminum or the like. The front surface of the bus bar 21 is plated with a metal such as tin or nickel. The lengthwise dimension of the bus bar 21 (i.e., the dimension in the right and left direction in FIGS. 3 and 4) is determined in accordance with the dimension between the electrode terminals 12A and 12B of the neighboring batteries 11.

As depicted in FIG. 2, the bus bar 21 is provided with a pair of through holes 23 with a predetermined interval interposed therebetween. The electrode posts 13B of the electrode terminals 12 of the battery 11 are respectively inserted into the paired through holes 23. The through holes 23 in this embodiment are elongated in the direction in which the batteries are juxtaposed (i.e., in the right and left direction in FIG. 1). In this embodiment, the elongated through holes 23 absorb the irregularities of the pitches between the neighboring electrode terminals 12A and 12B, which are caused due to a manufacturing tolerance and an assembling tolerance of the batteries 11.

Further, as depicted in FIG. 3, the bus bar 21 is shaped such that the four corners of a rectangular flat plate are rounded, and with this configuration, the bus bar 21 is smoothly inserted into the holding portion 32 of the holder unit 31.

The bus bar 21 further includes expanded portions 22 expanded in the widthwise direction (shorter side direction) of the bus bar 21 and exhibiting a trapezoid shape in a top view. As depicted in FIG. 2, the expanded portions 22 are provided on both ends of the bus bar 21, and expand from the paired lengthwise end surfaces of the bus bar 21. The paired lengthwise end surfaces of the bus bar 21 are also provided with recesses 24 that neighbors the trapezoid expanded portions 22.

In respect of the two expanded portions 22 provided to the bus bar 21 and located closer to the reader in FIG. 2, the right expanded portion 22A is locked by the bus bar locking nail 39D of the holding portion 32 accepted in the neighboring recess 24.

(Voltage Detecting Terminal 25)

As depicted in FIG. 3, the voltage detecting terminal 25, which is to be layered on the bus bar 21 in the holding portion 32 of the second holder unit 31B, includes a flat plate body 26A, and the barrel 26B continued from the body 26A. The detecting wire W is crimped to the barrel 26B. The center of the body 26A is opened to have an insertion hole 27. When the insertion hole 27 is layered on either one of the paired through holes 23 of the bus bar 21, the electrode post 13B of the electrode terminal 12, which has been inserted into the through hole 23 of the bus bar 21, is further inserted into the insertion hole 27. The insertion hole 27 is slightly greater than the through hole 23 of the bus bar 21.

In the voltage detecting terminal 25, the end edge where the barrel 26B is provided, and an end edge opposed to the aforementioned end edge are each provided with protruding pieces 28 extending outward therefrom. In respect of the two protruding pieces 28 provided to the end edge where the barrel 26B is provided, the protruding piece 28A located on the right side in FIG. 2 (first protruding piece 28A) is locked by the terminal locking nail 39C of the holding portion 32. With this configuration, the voltage detecting terminal 25 is restricted from moving upward. Between the two protruding pieces 28 provided to the end edge of the barrel 26B, a recess 29 is provided by a cutout. The recess 29 of the voltage detecting terminal 25 is disposed to be partially layered upon the recess 24 of the corresponding bus bar 21, so that the bus bar locking nail 39D is accepted.

The protruding piece 28 provided to the end edge opposed to the end edge where the barrel 26B is provided (second protruding piece 28) is locked by the terminal locking piece 37 of the holding portion 32. With this configuration, the voltage detecting terminal 25 is restricted from moving in the up and down direction.

The voltage detecting terminal 25 is formed through press working by shaping into a predetermined shape a plate material made of copper, copper alloy, stainless steel, aluminum or the like. The surface of the voltage detecting terminal 25 may be plated with a metal such as tin or nickel.

The detecting wire W connected to the voltage detecting terminal 25 is housed in the wire housing 50 of the holder unit 31, and connected to the monitoring ECU located on the right side in FIG. 1.

(First Holder Unit 31A)

Figure 5:
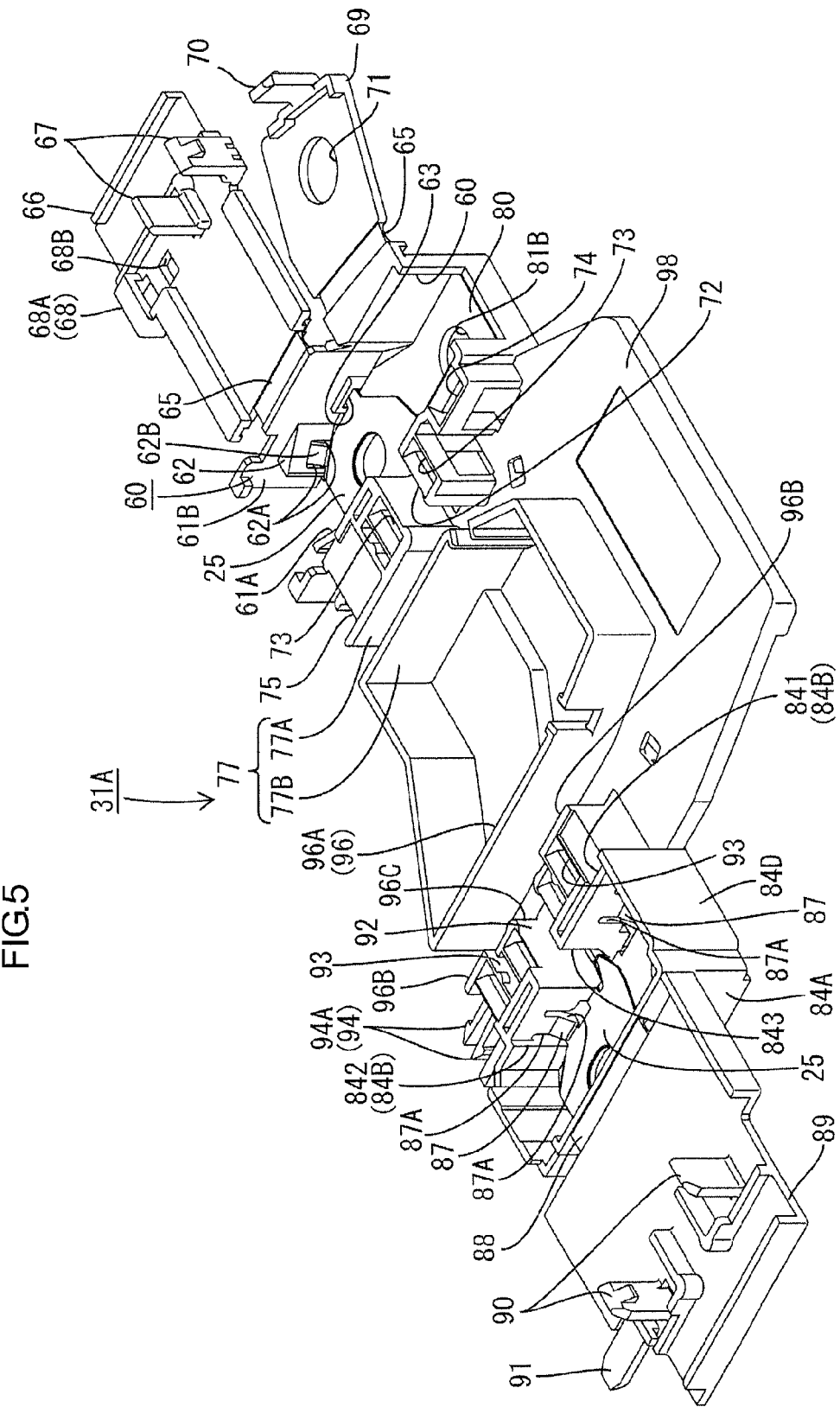
FIG. 5 is a perspective view depicting a first holder unit.

In the next description, the first holder unit 31A will be described. As depicted in FIGS. 1, 5 and 6, the first holder unit 31A includes: two holding portions 60 and 83 that house and hold the bus bar 21 and the voltage detecting terminal 25; two guiding grooves 72 and 92 that guide the detecting wire W connected to the voltage detecting terminal 25; and two wire housings 76 and 95 that house the detecting wire W of the voltage detecting terminal 25 taken out from the guiding grooves 72 and 92. In the first holder unit 31A, the two wire housings 76 and 95 are continued from a joint portion 98 provided at substantially the center of the first holder unit 31A, and the two holding portions 60 and 83 are respectively covered with lids 66, 69 and 89. These members are integrally formed.

In the following description, each member of the first holder unit 31A will be described. In respect of the two holding portions 60 and 83 of the first holder unit 31A, the holding portion 60 located on a side apart from the reader in FIG. 1 will be referred to as a first holding portion 60 while the holding portion 83 located on a side closer to the reader in FIG. 1 will be referred to as a second holding portion 83.

(First Holding Portion 60 of First Holder Unit 31A)

The first holding portion 60 houses an outer connecting bus bar 80 for use in connecting the electrode terminal 12 with an outer device (not depicted). By disposing the right wall 84D of the holding portion 32 of the neighboring second holder unit 31B to the left of the first holding portion 60, the bus bar 21 held by the second holder unit 31B and the outer connecting bus bar 80 of the first holding portion 60 are kept from contacting each other.

As depicted in FIG. 5, the first holding portion 60, which is open upward, includes: a wall that is located closer to the reader in FIG. 6 and holds the outer connecting bus bar 80 (front wall 61A); a wall located apart from the reader in FIG. 6 (rear wall 61B); and a bottom wall 61C on which the outer connecting bus bar 80 is mounted.

Figure 8:
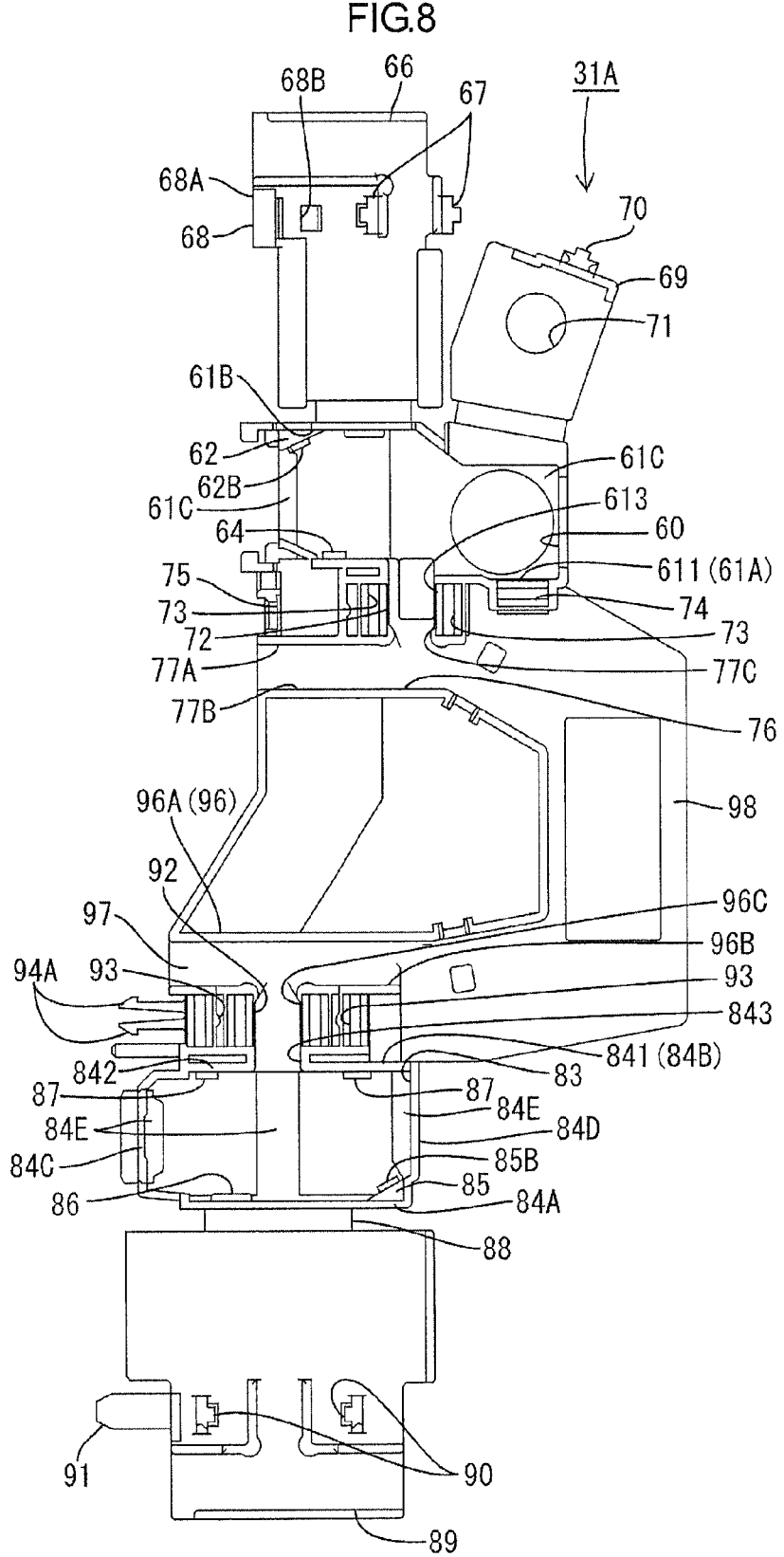
FIG. 8 is a plan view depicting the first holder unit prior to the insertion of connectors.

As depicted in FIG. 8, the bottom wall 61C is provided to the right portion of the first holding portion 60 as well as to the left end of the first holding portion 60 (see the depiction), and thus the first holding portion 60 is partially provided with the bottom wall 61C. The front wall 61A and the rear wall 61B are sized to be higher than the upper end of the electrode terminal 12 when the battery wiring module 20 is attached to the battery group 10, such that the short circuits due to the contact of the electrode terminal 12 with the tools and the like are prevented.

At substantially the lengthwise center of the front wall 61A, an opening 613 is opened to penetrate through the first guiding groove 72, and the opening 613 divides the front wall 61A into two portions. In respect of the two divisional portions of the front wall 61A divided by the opening 613, the first one located on the right side in FIG. 6 will be referred to as a right front wall 611 while the second one located on the left side in FIG. 6 will be referred to as a left front wall 612.

At the left end of the rear wall 61B in FIG. 6, a first locking protrusion 62 exhibiting a triangle shape in a top view protrudes from an inner surface of the rear wall 61B. The lateral surface of the first locking protrusion 62 includes: two slits 62A; and an elastic piece 62B provided between the two slits 62A and restricting the outer connecting bus bar 80 from moving upward. The elastic piece 62B is elastically deformed inward of the first locking protrusion 62 when the elastic piece 62B abuts on the end of the outer connecting bus bar 80 inserted in the first holding portion 60 from the above, and then the elastic piece 62B elastically returns to the original position when the outer connecting bus bar 80 is mounted on the bottom wall 61C, and locks the outer connecting bus bar 80 by restricting the up and down movement of the outer connecting bus bar 80.

At a position adjacent to the first locking protrusion 62 of the rear wall 61B, a terminal locking portion 63 protrudes from the inner wall surface of the rear wall 61B. The terminal locking portion 63 accepts the second protruding piece of the voltage detecting terminal, thereby locking the voltage detecting terminal. The first locking protrusion 62 and the terminal locking portion 63 protrude from the inner wall of the rear wall 61B, and the outer connecting bus bar 80 is not exposed from the rear wall 61B. Thus, the configuration prevents the short circuits due to the contact of the outer connecting bus bar 80 with the tools or metal members disposed in the neighborhood.

The left front wall 612 is provided with two slits (not depicted) extending upward from the lower end. Between the two slits, a first locking piece 64 is provided to lock the outer connecting bus bar 80. The first locking piece 64 is elastically deformed outward of the front wall 61A when the first locking piece 64 abuts on the end of the outer connecting bus bar 80 inserted in the first holding portion 60 from the above, and then the first locking piece 64 elastically returns to the original position when the outer connecting bus bar 80 is mounted on the bottom wall 61C, and locks the outer connecting bus bar 80 by restricting the up and down movement of the outer connecting bus bar 80.

As depicted in FIGS. 5 and 6, the first holding portion 60 is provided with the two lids 66 and 69 via a hinge 65 continued from the upper end of the rear wall 61B. The lids 66 and 69 are rotatable around the hinge 65.

By closing the left lid 66 provided on the left side in FIG. 6, the left lid 66 covers the left half region of the first holding portion 60, the first guiding groove 72 and a part of the first wire housing 76.

As depicted in FIGS. 5 and 6, a pair of left lid locking pieces 67 protrudes from the surface of the left lid 66 that faces downward when the left led 66 is closed. The left lid locking piece 67 is locked by third locking grooves 73 (the details of which will be later described) provided on both widthwise sides of the first guiding groove 72.

A lid joint engaged portion 68 is provided at a position adjacent to the paired left lid locking pieces 67, and accepts a lid joint engaging piece 43 provided to the first lid 41 of the neighboring second holder unit 31B. The lid joint engaged portion 68, which is configured similarly to the lid joint engaged portion 44 provided to the first lid 41 of the second holder unit 31B, includes: an engaging piece insertion portion 68A that penetrates in the direction in which the holder units 31 are coupled and accepts the insertion of the lid joint engaging piece 43 provided to the first lid 41 of the neighboring second holder unit 31B; and a joint engaged hole 68B that is provided adjacently to the engaging piece insertion portion 68A and accepts and engages with the joint engaging projection 43A of the lid joint engaging piece 43.

Substantially the center of the right lid 69 provided on the right side in FIG. 6 has a connecting terminal insertion hole 71 into which a bolt-shaped outer connection terminal 82 is inserted. The outer connection terminal 82 is inserted into an outer terminal connecting hole 81A of the outer connecting bus bar 80 held by the first holding portion 60. As depicted in FIGS. 5 and 6, a right lid locking piece 70 protrudes from the surface of the right lid 69 that faces downward when the right lid 69 is closed. The right lid locking piece 70 is locked by a fourth locking groove 74 (the details of which will be later described) provided adjacently to the third locking grooves 73. When the right lid 69 is closed, the right half region of the first holding portion 60 is covered with the right lid 69, but the outer connecting terminal 82 protrudes from the connecting terminal insertion hole 71.

(First Guiding Groove 72)

The first guiding groove 72, in which the barrel 26B of the voltage detecting terminal 25 taken out from the first holding portion 60 and the detecting wire W crimped to the barrel 26B are disposed, communicates with the first holding portion 60 and the first wire housing 76. The first guiding groove 72 is recessed, and extends substantially perpendicularly to the direction in which the batteries 11 are juxtaposed. More specifically, the first guiding groove 72 penetrates through the opening 613 of the front wall 61A of the first holding portion 60, and communicates with the first holding portion 60. The first guiding groove 72 also penetrates through the opening 77C of a rear groove wall 77A of the first wire housing 76, and communicates with the first wire housing 76.

As depicted in FIGS. 5 and 6, the pair of third locking grooves 73 that accepts and locks the paired left lid locking pieces 67 is provided on both side of the first guiding groove 72, and the fourth locking groove 74 that accepts and locks the right lid locking piece 70 is provided at a position adjacent to the right third locking groove 73.

In addition, as depicted in FIGS. 5 and 6, a joint engaging recess 75 engageable with the joint engaging nail 48 of the neighboring second holder unit 31B is provided at a position adjacent to the third locking groove 73 formed on the left side of the first guiding groove 72. When the pair of elastic pieces 48A included in the joint engaging nail 48 of the neighboring second holder unit 31B is inserted into the joint engaging recess 49 of the first holder unit 31A, the paired elastic pieces 48A are elastically deformed in a direction in which the paired elastic pieces 48A approach each other. When the joint engaging nail 48 reaches a predetermined position within the joint engaging recess 75, the elastic pieces 48A elastically returns to their original positions, thereby engaging with the joint engaging recess 75.

(First Wire Housing 76)

The first wire housing 76 is a recess in the cross sectional view, and the recess is defined by: a pair of groove walls 77 (rear groove wall 77A and front groove wall 77B) extending in the direction in which the batteries 11 are juxtaposed; and a bottom wall 78 connecting the paired groove walls 77 together. When the first holder unit 31A is jointed with the neighboring second holder unit 31B, the wire housing 50 of the second holder unit 31B is jointed with the first wire housing 76 of the first holder unit 31A to be in communication with the first wire housing 76, such that a single groove (wire housing groove 51) is formed to extend in the direction in which the batteries 11 are juxtaposed.

The detecting wire W taken out from the first guiding groove 72 is bent at substantially a right angle, and housed in the first wire housing 76 together with the other detecting wires W. Then, the detecting wire W is guided to the monitoring ECU.

The rear groove wall 77A of the first guiding groove 72 is provided to correspond to the front wall 61A of the first holding portion 60. Even if the outer connecting bus bar 80 or the voltage detecting terminal 25 is exposed through the slits formed at both sides of the first locking piece 64 or through a slit cutout between a lower end of the first locking piece 64 and the bottom wall 61C, the rear groove wall 77A serves to prevents the outer connecting bus bar 80 or the voltage detecting terminal 25 from contacting the conductive members and the like disposed in its neighborhood.

(Outer Connecting Bus Bar 80)

As depicted in FIG. 6, the outer connecting bus bar 80 held by the first holding portion 60 of the first holder unit 31A has on its left side the through hole 81A through which the electrode post 13B of the electrode terminal 12 is inserted, and has on its right side an outer terminal connecting hole 81B through which the bolt outer connecting terminal 82 (i.e., the terminal connected to outer devices) is inserted. Like the through hole 23 of the bus bar 21, the through hole 81A of the outer connecting bus bar 80 is also elongated in the direction in which the batteries 11 are juxtaposed (right and left direction in FIG. 1), and absorbs the irregularities of the pitches between the neighboring electrode terminals 12A and 12B, which are caused due to a manufacturing tolerance and an assembling tolerance of the batteries 11. The outer connecting bus bar 80 is made of a material similar to that of the bus bar 21 held by the holding portion 32 of the above-described second holder unit 31B.

(Voltage Detecting Terminal 25)

The voltage detecting terminal 25 held by the first holding portion 60 of the first holder unit 31A has the same configuration as the one held by the second holder unit 31B. The voltage detecting terminal 25 is locked by the first holding portion 60 with the second protruding piece 28B accepted by the terminal locking portion 63 of the rear wall 61B of the first holding portion 60.

(Second Holding Portion 83 of First Holder Unit 31A)

The second holding portion 83 (an example of the holding portion of the first holder unit 31A) houses the bus bar 21 connecting the electrode terminals 12 and 12 together. To the left of the second holding portion 83, the open end 34 of the neighboring second holder unit 31B is disposed. However, the second holding portion 83 of the first holder unit 31A is provided with an encompassing wall 84 (an example of the encompassing wall 84) that encompasses the entire circumference edge of the bus bar 21, and thus the bus bar 21 is kept from contacting the bus bar 21 held by the second holder unit 31B.

As depicted in FIGS. 5 and 6, the second holding portion 83, which is open upward, includes the encompassing wall 84 (84A, 84B, 84C and 84D) that encompasses the entire circumference edge of the bus bar 21, and a bottom wall 84E on which the bus bar 21 is mounted.

As depicted in FIG. 8, the bottom wall 84E is partially provided to each of the left and right end portions (as depicted) and the central portion of the second holding portion 83. The bus bar 21 is partially mounted on the bottom wall 84E, and the bottom wall 84E is configured to not interrupt the electric connection between the bus bar 21 and the electrode terminal 12.

Though the details thereof are not depicted, the encompassing wall 84 is sized to be higher than the upper end of the electrode terminal 12 when the battery wiring module 20 is attached to the battery group 10. This arrangement suppresses tools or the like from contacting the positive terminal 12A and the negative terminal 12B, thereby suppressing the short circuit between the positive terminal 12A and the negative terminal 12B via the tools or the like.

The encompassing wall 84 includes: a rear wall 84B disposed to extend along the lengthwise lateral edge of the bus bar 21 located apart from the reader in FIG. 6; a front wall 84A disposed to extend along the lengthwise lateral edge of the bus bar 21 located closer to the reader in FIG. 6; a right wall 84D disposed to extend along the shorter lateral edge of the bus bar 21 located on the right side in FIG. 6; and a left wall 84C disposed to extend along the shorter lateral edge of the bus bar 21 located on the left side in FIG. 6.

At substantially the lengthwise center of the rear wall 84B, an opening 843 is opened to penetrate through the second guiding groove 92, and the opening 843 divides the rear wall 84B into two portions. In respect of the rear wall 84B divided by the opening 843 into the two portions, the rear wall 84B located on the right side in FIG. 6 will be referred to as a right rear wall 841, and the rear wall 84B located on the left side in FIG. 6 will be referred to as a left rear wall 842.

At the right end of the front wall 84A in FIG. 6, a second locking protrusion 85 exhibiting a triangle shape in a top view protrudes from the inner surface of the front wall 84A into the second holding portion 83. Though the details thereof are not depicted, the second locking protrusion 85 includes an elastic piece 85B. The elastic piece 85B is elastically deformed inward of the second locking protrusion 85 when the elastic piece 85B abuts on the end of the bus bar 21 inserted in the second holding portion 83 from the above, and then the elastic piece 85B elastically returns to the original position when the bus bar 21 is mounted on the bottom wall 84E, and locks the bus bar 21 by restricting the up and down movement of the bus bar 21.

At a region of the front wall 84A adjacent to the left side in FIG. 6 relative to the center of the front wall 84A, a terminal locking portion 86 protrudes from the inner wall surface of the front wall 84A. The terminal locking portion 86 accepts the second protruding piece 28B of the voltage detecting terminal 25, thereby locking the voltage detecting terminal 25. The second locking protrusion 85 and the terminal locking portion 86 of the front wall 84A protrude from the inner wall of the front wall 84A, and the bus bar 21 is not exposed from the front wall 84A. Thus, the configuration prevents the short circuits due to the contact of the bus bar 21 with the tools or metal members disposed in the neighborhood.

Figure 9:
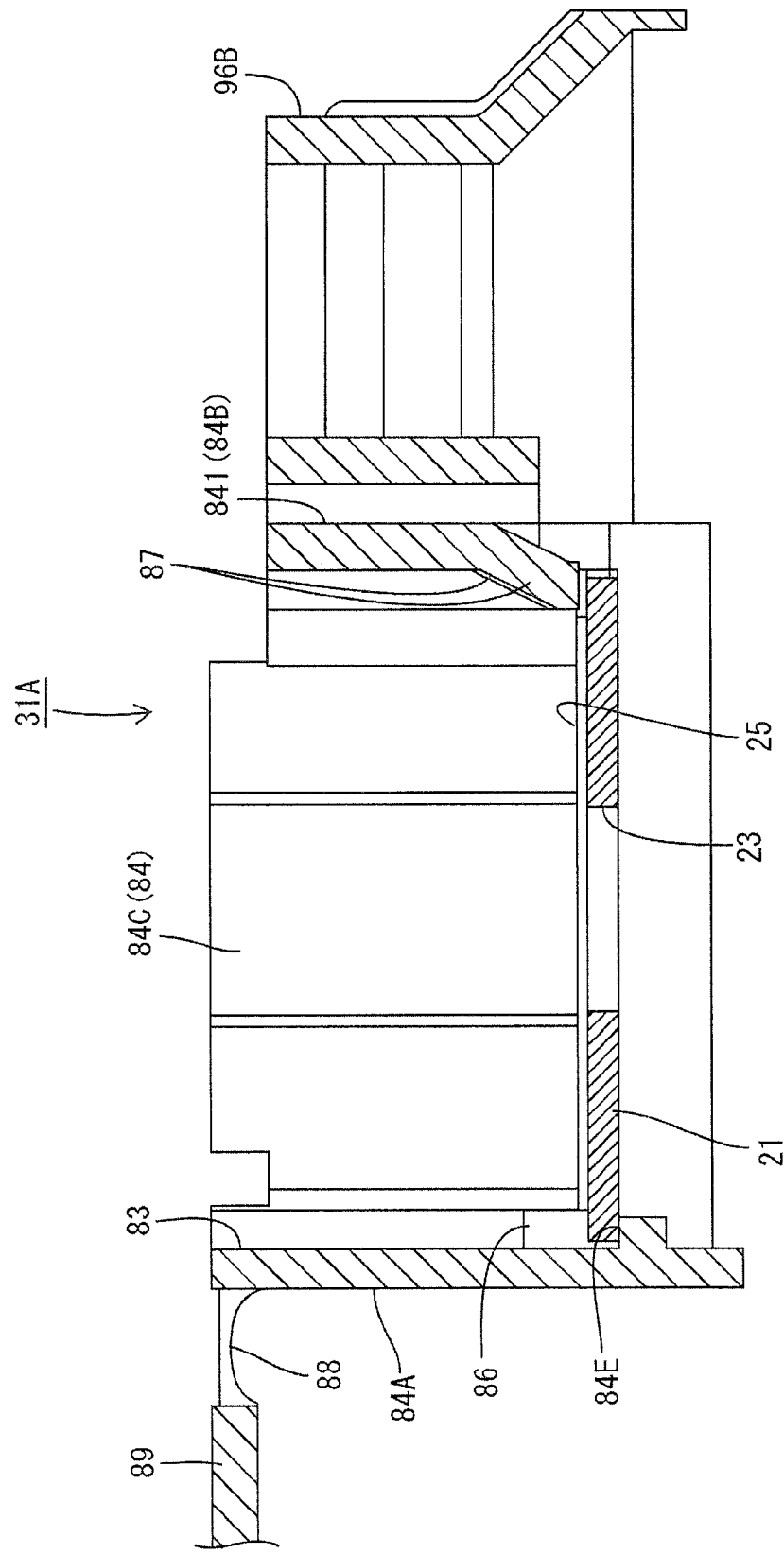
FIG. 9 is a cross sectional view depicting a portion cut along A to A segment in FIG. 6.
Figure 10:
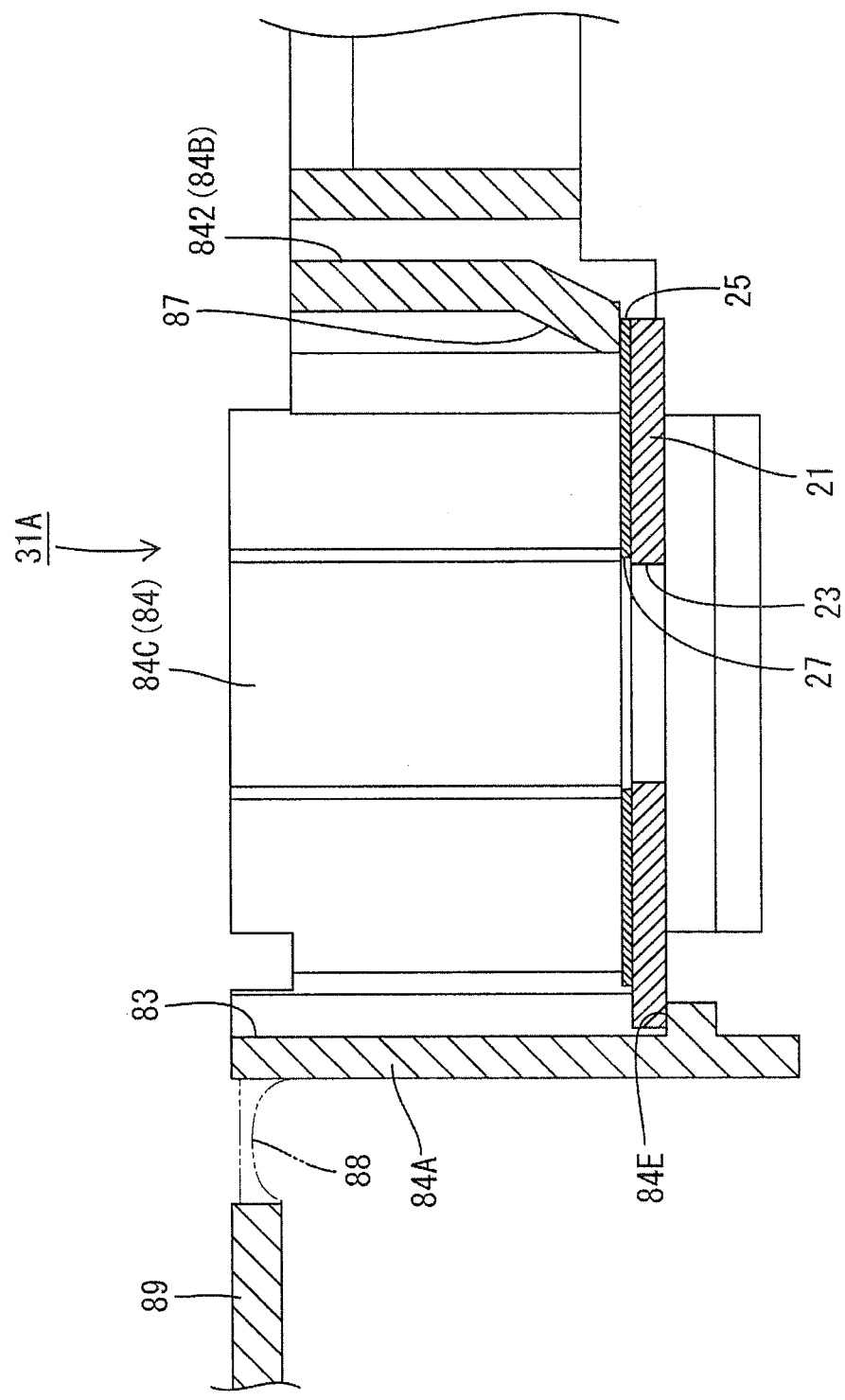
FIG. 10 is a cross sectional view taken along a line B-B in FIG. 6.

As depicted in FIGS. 5, 9 and 10, the right rear wall 841 and the left rear wall 842 are provided with two slits 87A extending upward from their lower ends. Between the two slits 87A, a second locking piece 87 (an example of a locking portion) is formed to lock the bus bar 21. The second locking piece 87 is elastically deformed outward of the rear wall 84B when abutting on the end of the bus bar 21 inserted into the second holding portion 83 from the above. When the bus bar 21 is mounted on the bottom wall 84E, the second locking piece 87 elastically returns to the original position, and restricts the up and down movement of the bus bar 21 to lock the bus bar 21.

As depicted in FIGS. 5 to 8, the second holding portion 83 is provided with a third lid 89 via a hinge 88 continued from the upper end of the front wall 84A. The third lid 89 is rotatable around the hinge 88. When the third lid 89 is closed, the third lid 89 covers the entire region of the second holding portion 83, the second guiding groove 92 and the second wire housing 95.

Figure 7:
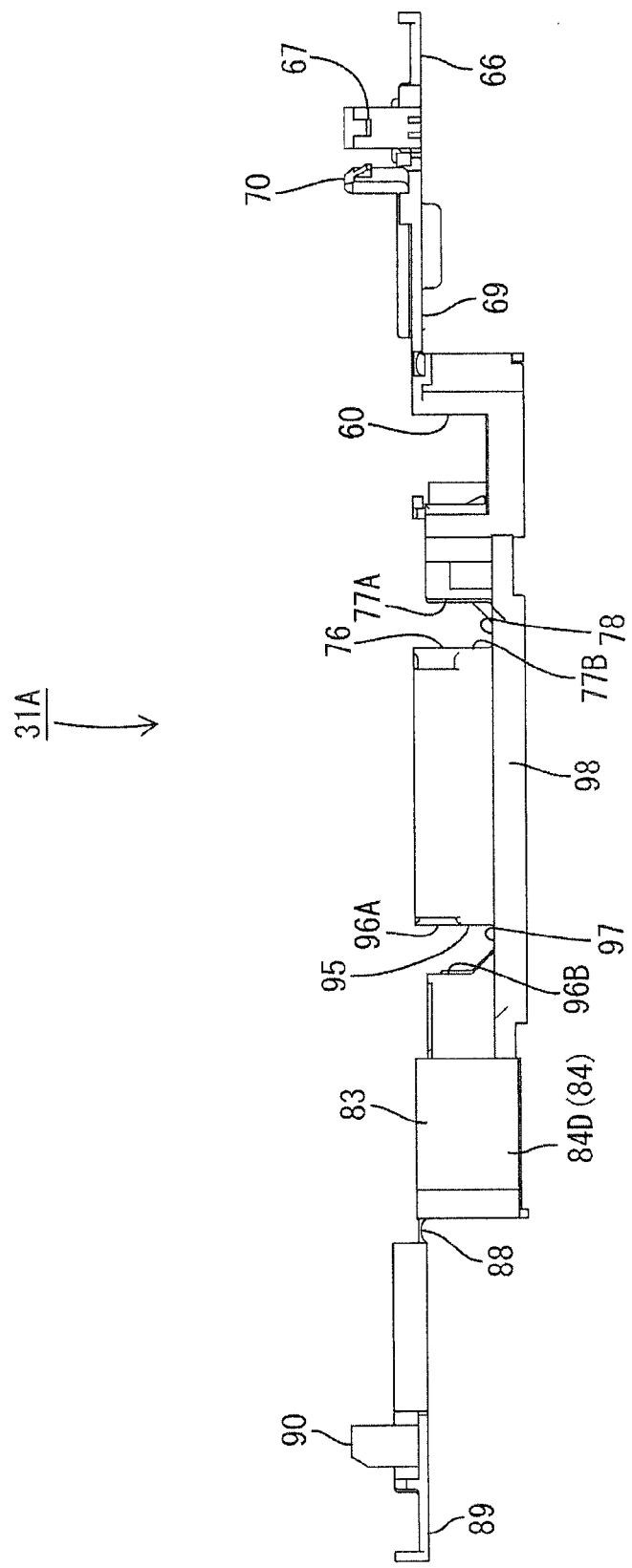
FIG. 7 is a lateral view depicting the first holder unit.

As depicted in FIGS. 5 and 7, a pair of third lid locking pieces 90 protrudes from the surface of the third lid 89 that faces downward when the third lid 89 is closed. The third lid locking pieces 90 are locked by fifth locking grooves 93 (the details of which will be later described) provided on both widthwise sides of the second guiding groove 92.

The third lid 89 includes a lid joint engaging piece 91 that engages with the lid joint engaged portion 44 of the first lid 41 provided to the neighboring second holder unit 31B. The lid joint engaging piece 91 is positioned at a position adjacent to the paired third locking pieces 90. The lid joint engaging piece 91 has the same configuration as the lid joint engaging piece 43 provided to the first lid 41 of the second holder unit 31B31A. An end of the lid joint engaging piece 91 is provided with a joint engaging projection (not depicted) engageable with the joint engaged hole 44B of the lid joint engaged portion 44 provided to the first lid 41 of the neighboring second holder unit 31B.

Therefore, by inserting the lid joint engaging piece 91 of the third lid 89 into the engaging piece insertion portion 44A of the lid joint engaged portion 44 of the neighboring second holder unit 31B, and engaging the joint engaging projection with the joint engaged hole 44B, the third lid 89 and the first lid of the second holder unit 31B are coupled together.

(Second Guiding Groove 92)

The second guiding groove 92, in which the barrel 26B of the voltage detecting terminal 25 taken out from the second holding portion 83 and the detecting wire W crimped to the barrel 26B are disposed, communicates with the second holding portion 83 and the second wire housing 95. The second guiding groove 92 is recessed, and extends substantially perpendicularly to the direction in which the batteries 11 are juxtaposed. More specifically, the second guiding groove 92 penetrates through the opening 843 of the rear wall 84B of the second holding portion 83, and communicates with the second holding portion 83. The second guiding groove 92 also penetrates through the opening 96C of a front groove wall 96B of the second wire housing 95, and communicates with the second wire housing 95.

As depicted in FIGS. 5 and 6, a joint engaging nail 94 engageable with the joint engaging recess 49 of the neighboring second holder unit 31B is provided at a position adjacent to the fifth locking groove 93 positioned to the left of the second guiding groove 92. Like the joint engaging nail 48 of the second holder unit 31B, the joint engaging nail 94 is provided at each end of a pair of elastic pieces 94A. When the pair of elastic pieces 94A is inserted into the joint engaging recess 49 of the neighboring second holder unit 31B, the paired elastic pieces 94A are elastically deformed in a direction in which the paired elastic pieces 94A approach each other. When the joint engaging nail 94 reaches a predetermined position within the joint engaging recess 49, the elastic pieces 94A elastically returns to their original positions, thereby engaging with the joint engaging recess 49.

(Second Wire Housing 95)

The second wire housing 95 is a recess in the cross sectional view, and the recess is defined by: a pair of groove walls 96 extending in the direction in which the batteries 11 are juxtaposed; and a bottom wall 97 connecting the paired groove walls 96 together. When the first holder unit 31A is jointed with the neighboring second holder unit 31B, the wire housing 50 of the second holder unit 31B is jointed with the first wire housing 76 of the first holder unit 31A to be in communication with the first wire housing 76, such that a single groove (wire housing groove 51) is formed to extend in the direction in which the batteries 11 are juxtaposed.

The detecting wire W taken out from the second guiding groove 92 is bent at substantially a right angle, and housed in the second wire housing 95 together with the other detecting wires W. Then, the detecting wire W is guided to the monitoring ECU.

The front groove wall 96B of the second guiding groove 92 is provided to correspond to the rear wall 84B of the second holding portion 83. Even if the bus bar 21 or the voltage detecting terminal 25 is exposed through the slits 87A formed at both sides of the second locking piece 87 or through a slit cutout between a lower end of the second locking piece 87 and the bottom wall 84E, the front groove wall 96B serves to prevent the bus bar 21 or the voltage detecting terminal 25 from contacting the conductive members and the like disposed in its neighborhood (the front groove wall 96B of the second wire housing 95 is an example of an insulating holding portion).

(Bus Bar 21)

As depicted in FIGS. 1 and 6, the bus bar 21 held by the second holding portion 83 of the first holder unit 31A has the same shape and size as the bus bar 21 held by the second holder unit 31B, and is made of the same material.

(Voltage Detecting Terminal 25)

The voltage detecting terminal 25 held by the second holding portion 83 of the first holder unit 31A has the same configuration as the one held by the second holder unit 31B as well as the one held by the first holding portion 60 of the first holder unit 31A. The second protruding piece 28B of the voltage detecting terminal 25 held by the second holding portion 83 is accepted by the terminal locking portion 86 of the front wall 84A of the second holding portion 83 and locked thereto.

(Method of Attaching the Battery Wiring Module 20)

Next, the method of attaching the battery wiring module 20 will be described.

First of all, the second holder unit 31B is attached with the bus bar 21, and the first holder unit 31A is attached with the bus bar 21 and the outer connecting bus bar 80.

When the bus bar 21 is inserted into the holding portion 32 through the open end 34 of the holding portion 32 of the second holder unit 31B, the bus bar 21 is guided to the right direction in FIG. 2 by the guide 36 provided to the rear wall 33A of the holding portion 32. When the expanded portion 22A of the bus bar 21 abuts on the bus bar locking nail 39D provided to the front wall 33B, the bus bar locking nail 39D is deformed to be bent outward of the wall 33.

When the bus bar 21 is further inserted frontward (in the right direction in FIG. 2) and the recess 24 of the bus bar 21 reaches the bus bar locking nail 39D, the bus bar locking nail 39D is accepted into the recess 24 of the bus bar 21, and the bus bar locking nail 39D elastically returns to the original position. With the end surface of the expanded portion 22A of the bus bar 21 abutting on the bus bar locking nail 39D, the front and back movement of the bus bar 21 in the insertion direction is restricted. In addition, the bus bar 21 is restricted by the locking portions 35 provided to the wall 33 from moving in the up and down direction, and locked thereto.

When the outer connecting bus bar 80 is inserted into the first holding portion 60 from the above of the first holding portion 60 of the first holder unit 31A, the outer connecting bus bar 80 abuts on the elastic piece 62B of the first locking protrusion 62 of the rear wall 61B and the first locking piece 64 provided to the left front wall 612. The elastic piece 62B is deformed to be bent inward of the first locking protrusion 62, and the first locking piece 64 is deformed to be bent outward of the first holding portion 60. Further, when the outer connecting bus bar 80 is inserted to be mounted on the bottom wall 61C, the elastic piece 62B and the first locking piece 64 elastically return to their original positions. Then, the outer connecting bus bar 80 is locked with its up and down movement restricted by the first locking protrusion 62 and the first locking piece 64.

When the bus bar 21 is inserted into the second holding portion 83 from the above of the second holding portion 83 of the first holder unit 31A, the bus bar 21 abuts on: the elastic piece 85B provided to the second locking protrusion 85 protruding within the second holding portion 83; the second locking piece 87 provided to the right rear wall 841; and the second locking piece 87 provided to the left rear wall 842. The elastic piece 85B is deformed to be bent inward of the second locking protrusion 85, and each of the second locking pieces 87 is bent outward of the second holding portion 83. Further, when the bus bar 21 is inserted to be mounted on the bottom wall 84E, the elastic piece 85B and the two second locking pieces 87 elastically return to their original positions. Then, the bus bar 21 is locked with its up and down movement restricted by the second locking protrusion 85 and the two second locking pieces 87.

Subsequently, the neighboring holder units 31 are coupled together. When the pair of elastic pieces 48A or 94A provided to the joint engaging nail 48 or 94 of the holder unit 31 are inserted into the joint engaging recess 49 or 75 of the neighboring holder unit 31 while the lids of the holder unit 31 (i.e., the first lid 41, the second lid 55, the third lid 89, the right lid 69 and the left lid 66) are open, the pair of elastic pieces 48A or 94A are inserted therein while the paired elastic pieces 48A or 94A are elastically deformed to approach each other. Then, when the paired elastic pieces 48A or 94A reach the predetermined position within the joint engaging recess 49 or 75, the paired elastic pieces 48A or 94A elastically return to their original positions to engage with the joint engaging recess 49 or 75, and the holding portions 32, 60 or 83, and the wire housing 50, 76 or 95 are coupled together.

At the ends, the holding portion 32 of the second holder unit 31B is coupled with the first holding portion 60 of the first holder unit 31A, and the holding portion 32 of the second holder unit 31B is coupled with the second holding portion 83 of the first holder unit 31A. Further at the ends, the wire housing 50 of the second holder unit 31B is coupled with the first wire housing 76 of the first holder unit 31A, and the wire housing 50 of the second holder unit 31B is coupled with the second wire housing 95 of the first holder unit 31A.

In addition, after the lid joint engaging piece 43 or 91 are inserted into the engaging piece insertion portion 44A or 68A of the lid joint engaged portion 44 or 68 of the neighboring holder unit 31, the joint engaging projection 43A is engaged with the joint engaged hole 44B or 68B. Then, the neighboring first lids 41, the neighboring first lid and third lid 89, and the neighboring first lid and left lid 66 are respectively coupled together.

By coupling together the plurality of second holder units 31B holding the bus bars 21, the insulating wall 33C of the holder unit 31 is positioned between the neighboring bus bars 21. Even when the holding portion 32 is provided with the open end 34, the bus bars 21 do not contact each other.

Further, by coupling the second holder unit 31B with the first holder unit 31A, the insulating wall 33C of the second holder unit 31B is disposed between the bus bar 21 and the outer connecting bus bar 80 neighboring each other on the side apart from the reader in FIG. 1. Thus, the bus bar 21 and the outer connecting bus bar 80 do not contact each other.

In addition, by coupling the second holder unit 31B with the first holder unit 31A, the left wall 84C of the first holder unit 31A is disposed between the bus bars 21 neighboring each other on the side closer to the reader in FIG. 1. Thus, the bus bars 21 do not contact each other.

Next, the voltage detecting terminal 25 is fitted to the bus bar 21 housed in the holding portion 32, and the detecting wire W crimped to the voltage detecting terminal 25 is taken out from the guiding groove 45, and guided to the wire housing 50 (the wire housing groove 51). In this manner, the voltage detecting terminal 25 is attached.

Likewise, the voltage detecting terminal 25 is fitted to the outer connecting bus bar 80 housed in the first holding portion 60 and to the bus bar 21 housed in the second holding portion 83. Then, the detecting wire W crimped to the voltage detecting terminal 25 is taken out from the guiding grooves (the first guiding groove 72 and the second guiding groove 92), and guided to the first wire housing 76 and the second wire housing 95 (the wire housing groove 51). In this manner, the voltage detecting terminal 25 is attached.

When the voltage detecting terminal 25 is attached to the holding portion 32, first of all, the second protruding piece 28B of the voltage detecting terminal 25 is inserted under the terminal locking piece 37. Then, the second protruding piece 28B of the voltage detecting terminal 25 is restricted by the locking protrusion 38 of the terminal locking piece 37 from moving upward and frontward and rearward in the insertion direction of the bus bar 21, and positioned thereto.

The end edge of the terminal detecting terminal 25 closer to the barrel 25B is pressed from the above to the holding portion 32. Then, the voltage detecting terminal 25 abuts on the terminal locking nail 39C of the elastic engaging piece 39A, and the terminal locking nail 39C is deformed to be bent outward of the wall 33. When the voltage detecting terminal 25 is further pressed downward and the voltage detecting terminal 25 is positioned to be lower than the lower end of the terminal locking nail 39C, the terminal locking nail 39C elastically returns to the original position, and extends over the voltage detecting terminal 25, thereby restricting the up and down movement of the voltage detecting terminal 25.

When the voltage detecting terminal 25 is attached to the holding portion 60, first of all, the second protruding piece 28B of the voltage detecting terminal 25 is inserted into the terminal locking portion 63. Then, the second protruding piece 28B of the voltage detecting terminal 25 is restricted by the terminal locking portion 63 from moving upward and frontward and rearward in the insertion direction of the bus bar 21, and positioned thereto. The end edge of the terminal detecting terminal 25 closer to the barrel 25B is pressed from the above to the first holding portion 60. Then, the voltage detecting terminal 25 abuts on the first locking piece 64, and the first locking piece 64 is deformed to be bent outward of the first holding portion 60. When the voltage detecting terminal 25 is further pressed downward and the voltage detecting terminal 25 is positioned to be lower than the lower end of the first locking piece 64, the first locking piece 64 elastically returns to the original position, and extends over the voltage detecting terminal 25, thereby restricting the up and down movement of the voltage detecting terminal 25.

When the voltage detecting terminal 25 is attached to the second holding portion 83, first of all, the second protruding piece 28B of the voltage detecting terminal 25 is inserted into the terminal locking portion 86. Then, the second protruding piece 28B of the voltage detecting terminal 25 is restricted by the terminal locking portion 86 from moving upward and frontward and rearward in the insertion direction of the bus bar 21, and positioned thereto. The end edge of the terminal detecting terminal 25 closer to the barrel 25B is pressed from the above to the second holding portion 83. Then, the voltage detecting terminal 25 abuts on the second locking piece 87 of the left rear wall 842, and the second locking piece 87 is deformed to be bent outward of the second holding portion 83. When the voltage detecting terminal 25 is further pressed downward and the voltage detecting terminal 25 is positioned to be lower than the lower end of the second locking piece 87, the second locking piece 87 elastically returns to the original position, and extends over the voltage detecting terminal 25, thereby restricting the up and down movement of the voltage detecting terminal 25. When the attachment of all of the voltage detecting terminals 25 is over, the battery wiring module 20 is completed.

Next, the battery wiring module 20 is attached to the battery group 10. The battery group 10 is prepared by juxtaposing the batteries 11 such that the neighboring electrode terminals 12 of the neighboring batteries 11 exhibit different polarities. Then, the battery wiring module 20 is attached to the battery group 10. More specifically, the electrode terminals 12 (the electrode posts 13B) of the batteries 11 are inserted into the through holes 23 of the bus bars 21, the through holes 81A of the outer connecting bus bars 80, and the insertion holes 27 of the voltage detecting terminals 25 layered on the through holes 23 and 81A. The outer connection terminal 82 is inserted into an outer terminal connecting hole 80B of the outer connection bus bar 80.

At this time, in the second holder unit 31B, the bus bar 21 is inserted therein along the direction in which the batteries 11 are juxtaposed, and held by the holding portion 32 with its up and down movement restricted by the locking portion 35. Thus, even when the battery wiring module 20 collides with the electrode posts 13B and the upper surfaces 11A (electrode-terminals forming surfaces) of the batteries 11, the bus bars 21 are not easily pressed upward. Thus, the operations are smoothly conducted.

The electrode posts 13B are inserted into the through holes 23 or the through holes 23 and the insertion holes 27, such that the bus bars 21 are positioned to contact the bases of the electrode terminals 12. Then, by screwing (not depicted) the electrode posts 13B thereto, the electrode posts 13B are fixed thereto. At this time, since the walls 33 of the holder units 31 are sized to be higher than the electrode posts 13B, short circuits will not be generated even when the tools for use in screwing the electrode posts 13B are dropped thereto or brought into contact therewith.

When the fixation of the electrode posts 13B by screwing is completed by repeating the above operations, the battery group 10 becomes electrically connectable. Subsequently, the second lid 55 and the first lid 41 of the battery wiring module 20 are closed in this order. Upon the closure of the third lid 89, the left lid 66 and the right lid 69, the battery module M is completed.

Operations and Advantages and Effects of the Present Embodiment

In the following description, the advantages and the effects of this embodiment will be described.

In this embodiment, even when the bus bar 21 is exposed through the bus bar insertion portion 34 (the open end 34) of the second holder unit 31B, the first holder unit 31A is disposed at the end of the second holder unit 31B on the side of the open end 34. The first holder unit 31A includes the second holding portion 83 having the encompassing wall 84 encompassing the entire edge of the bus bar 21. Therefore, according to this embodiment, the bus bar 21 is not exposed from the holder unit 31 (31A, 31B), which prevents the short circuits from being caused due to the contact of the bus bar 21 with the members disposed in the neighborhood of the batteries 11.

Further according to this embodiment, except for the first holder units 31A disposed at the ends, the holder units are the second holder units 31B having the holding portions 32 provided with the bus bar insertion portions 34 through which the respective bus bars 21 are inserted in the direction in which the batteries 11 are juxtaposed (the horizontal direction). Thus, the bus bars 21 are not easily disengaged therefrom due to the collision of the bus bar 21 with the upper surfaces 11A (electrode-terminal forming surface) or the electrode terminals 12 of the batteries 11. Accordingly, the attachment to the battery group 10 is more efficiently conducted.

Further according to the embodiment, the bus bar 21 is inserted into the second holding portion 83 of the first holder unit 31A and inserted through the bus bar insertion portion 34 of the second holder unit 31B. Thus, the bus bar 21 having the same shape is used for both of the two holder units 31A and 31B, and the yield is favorable.

Further according to this embodiment, the encompassing wall 84 of the second holding portion 83 of the first holder unit 31A is provided with the second locking piece 87 that locks the bus bar 21 with respect to the second holding portion 83. Outside of the second holding portion 83, the front groove wall 96B is provided to correspond to the second locking piece 87 as the insulating holding portion for keeping the insulation of the bus bar 21. As a result, according to this embodiment, even when the encompassing wall 84 is provided with the slits 87A and the like in order to provide the second locking piece 87 that locks the bus bar 21, the bus bar 21 is kept insulated. Thus, while the bus bar 21 is locked, the short circuits are prevented from being caused due to the contact of the bus bar 21 with the members disposed in the neighborhood of the batteries 11.

Further according to this embodiment, the second holding portion 83 of the first holder unit 31A houses the bus bar 21 as well as the voltage detecting terminal 25. In addition, the terminal locking portion 86 protrudes from the inner wall of the encompassing wall 84 of the first holder unit 31A, and the terminal locking portion 86 locks the bus bar 21 by locking the voltage detecting terminal 25. As a result, according to this embodiment, by locking the voltage detecting terminal 25 with the terminal locking portion 86 provided to the encompassing wall 84 of the first holder unit 31A, the bus bar 21 is locked to the first holder unit 31A. Thus, a single member performs two functions. Additionally according to this embodiment, the terminal locking portion 86 protrudes from the inner wall of the encompassing wall 84, and the bus bar 21 and the voltage detecting terminal 25 are not exposed from the encompassing wall 84. Thus, the insulation is also kept.

Other Embodiments

The invention is not limited to the embodiments described above and depicted in the drawings, but includes in its technical scope, for instance, the following embodiments.

(1) In the above embodiment, the bus bar 21 connected to the second holding portion 83 of the first holder unit 31A has the same shape as the bus bar 21 connected to the holding portion of the second holder unit 31B, but these two bus bars may have respectively different shapes.

(2) In the above embodiment, the front groove wall 96B of the second wire housing 95 exemplarily serves as the insulating holding portion corresponding to the second locking piece 87 of the encompassing wall 84 of the first holder unit 31A, but an insulating plate different from the wire housing may be disposed to correspond to the second locking piece.

(3) In the above embodiment, the terminal locking portion 86 protrudes from the inner wall of the encompassing wall 84, but the terminal locking portion may be provided by partially hollowing the encompassing wall to the extent not to penetrate through the encompassing wall. In addition, the first holder unit may have a holding portion provided with no terminal locking portion.

EXPLANATION OF SYMBOLS

M: Battery module
10: Battery group
11: Battery
11A: Upper surface (terminal forming surface)
12: Electrode terminal
12A: Positive electrode terminal
12B: Negative electrode terminal
20: Battery wiring module
21: Bus bar (connector)
23: Through holes
25: Voltage detecting terminal
27: Insertion hole
28B: Second protrusion piece
W: Detecting wire
31: Holder unit
31A: First holder unit
31B: Second holder unit
32: Holding portion
33: Wall
33C: Right wall
34: Open end (connector insertion portion)
35: Locking portion
37: Terminal locking piece
38: Locking protrusion 39A: Elastic engaging piece
60: First holding portion
80: Outer connecting bus bar
83: Second holding portion
84: Encompassing wall
84A: Front wall
84B: Rear wall
841: Right rear wall
842: Left rear wall
84C: Left wall
84D: Right wall
86: Terminal locking piece
87: Locking piece
87A: Slit
95: Second wire housing
96: Groove wall
96A: Rear groove wall
96B: Front groove wall (insulating holding portion)

An aspect of the technology described in the specification provides a battery wiring module attached to a battery group formed by juxtaposing a plurality of batteries each having positive and negative electrode terminals, and the battery wiring module includes: a plurality of connectors connected to the electrode terminals; and a plurality of holder units made of an insulating resin and having holding portions that holds the connectors. In the battery wiring module, the holder units include: a first holder unit disposed at an end; and a second holder unit which is a holder unit other than the first holder unit. Further in the battery wiring module, the holding portion of the second holder unit is provided with a connector insertion portion through which the connectors are inserted in the direction in which the batteries are juxtaposed, while the holding portion of the first holder unit is provided with an encompassing wall encompassing the entire circumferential edges of the connectors and adapted to insert the connectors in a direction in which the first holder unit is attached to the battery group.

According to the aspect of the technology described in the specification, even when the connector is exposed through the connector insertion portion of the second holder unit, the first holder unit is disposed at the end, and the first holder unit has the holding portion provided with the encompassing wall encompassing the entire circumferential edge of the connector. Therefore, according to the aspect of the invention, the connector is not exposed from the holder unit, and thus a short circuit is prevented from being caused due to a contact of the connector with a member disposed in the neighborhood thereof.

When a holder unit configured such that the connectors are inserted in the direction in which the holder unit is attached is concerned, the holder unit may collide with the electrode terminal forming surfaces of the batteries included in the battery group or with the electrode terminals at the time of attaching the holder unit to the battery group. Such collision may press upward the connectors and disengage the connectors therefrom, thereby reducing the efficiency of the attachment of the holder unit to the battery group.

However, according to the aspect of the technology described in the specification, the holder units other than the first holder unit disposed at the end are the second holder units each having the holding portion provided with the connector insertion portion through which the connectors are inserted in the direction in which the batteries are juxtaposed. Thus, the connectors are not easily disengaged therefrom, and the efficiency in attaching the holder unit to the battery group is enhanced.

The aspect of the technology described in the specification may include the following configuration.

The connectors may be adapted to be inserted into the holding portion of the first holder unit, and may be adapted to be inserted through the connector insertion portion of the second holder unit.

With this configuration, even though the two types of the holder units are used, one type of the connector is usable, which increases the yield.

The encompassing wall of the first holder unit may be provided with a locking portion that locks the connectors to the holding portion of the first holder unit, and an outside of the encompassing wall of the first holder unit may have an insulating holding portion that keeps an insulation of the connectors and corresponds to the locking portion.

With this configuration, even when the encompassing wall of the first holder unit is provided with a slit, cutout or the like in order to form the locking portion that locks the connectors inserted in the attaching direction of the holder unit, the connectors are kept insulated. The configuration locks the connectors, and prevents a short circuit from being caused due to a contact of the connectors with members disposed in the neighborhood of the batteries.

The holding portion of the first holder unit may be adapted to house the connectors and a voltage detecting terminal, and an inner wall side of the encompassing wall of the first holder unit may have a protruding or recessed terminal locking portion that locks the connectors by locking the voltage detecting terminal.

With this configuration, the connectors are locked to the first holder unit by locking the voltage detection terminal to the terminal locking portion provided to the encompassing wall of the first holder unit. Thus, a single member performs two functions. In addition, the terminal locking portion protrudes from or is recessed in the inner wall of the encompassing wall, and the connectors and the voltage detecting terminal are not exposed from the encompassing wall. Thus, the insulation is maintained.

According to the aspect of the technology described in the specification, the battery module prevents a short circuit from being caused due to the contact of the connectors with the members disposed in the neighborhood of the batteries.

The invention claimed is:
1. A battery wiring module attached to a battery group formed by juxtaposing a plurality of batteries each having positive and negative electrode terminals, the battery wiring module comprising:
  a plurality of connectors connected to the electrode terminals; and
  a plurality of holder units made of an insulating resin and having holding portions that holds the connectors, wherein:
    the holder units include a first holder unit, and a plurality of second holder units joined together, the first holder unit is disposed at an end of the jointed second holder units;
    the holding portion of the second holder units is provided with a wall closing lateral sides other than in a direction in which the batteries are juxtaposed, and a connector insertion portion through which the connectors are inserted in the direction in which the batteries are juxtaposed; and
    the holding portion of the first holder unit is provided with an encompassing wall encompassing the entire circumferential edges of the connectors and adapted to insert the connectors in a direction in which the first holder unit is attached to the battery group.

2. The battery wiring module according to claim 1, wherein the connectors are adapted to be inserted into the holding portion of the first holder unit, and adapted to be inserted through the connector insertion portion of the second holder unit.

3. The battery wiring module according to claim 1, wherein:
- the encompassing wall of the first holder unit is provided with a locking portion that locks the connectors to the holding portion of the first holder unit; and
- an outside of the encompassing wall of the first holder unit has an insulating holding portion that keeps an insulation of the connectors and corresponds to the locking portion.

4. The battery wiring module according to claim 1, wherein the holding portion of the first holder unit adapted to house the connectors and a voltage detecting terminal, and
- an inner wall side of the encompassing wall of the first holder unit has a protruding or recessed terminal locking portion that locks the connectors by locking the voltage detecting terminal.

\* \* \* \* \*